United States Patent
Dufelmeier et al.

(10) Patent No.: US 12,081,256 B2
(45) Date of Patent: Sep. 3, 2024

(54) COVER FOR FOLDING PORTABLE ELECTRONIC DEVICE WITH HINGE PROTECTION

(71) Applicant: FELLOWES MOBILE LLC, Itasca, IL (US)

(72) Inventors: Jack Dufelmeier, Chicago, IL (US); Richard Kang, Palatine, IL (US)

(73) Assignee: Fellowes Mobile LLC, Itasca, IL (US)

( * ) Notice: Subject to any disclaimer, the term of this patent is extended or adjusted under 35 U.S.C. 154(b) by 0 days.

(21) Appl. No.: 18/489,406

(22) Filed: Oct. 18, 2023

(65) Prior Publication Data

US 2024/0137062 A1 Apr. 25, 2024
US 2024/0235599 A9 Jul. 11, 2024

Related U.S. Application Data

(60) Provisional application No. 63/417,561, filed on Oct. 19, 2022.

(51) Int. Cl.
*H04B 1/3888* (2015.01)
*H04M 1/04* (2006.01)

(52) U.S. Cl.
CPC ............ *H04B 1/3888* (2013.01); *H04M 1/04* (2013.01)

(58) Field of Classification Search
CPC .... H04B 1/3888; H04M 1/04; H04M 1/0203; G06F 1/1628; G06F 1/1629
See application file for complete search history.

(56) References Cited

U.S. PATENT DOCUMENTS

| | | | |
|---|---|---|---|
| 7,311,366 B2 | 12/2007 | Kim et al. | |
| 7,593,524 B2 | 9/2009 | Maenpaa | |
| 9,483,081 B2 | 11/2016 | Lee et al. | |
| 9,778,682 B2 | 10/2017 | Lee | |
| 9,874,908 B2 | 1/2018 | Han et al. | |
| 10,297,785 B2 | 5/2019 | Ahn et al. | |
| 10,539,978 B2 | 1/2020 | Lee et al. | |
| 10,681,194 B2 | 6/2020 | Lee et al. | |
| 10,798,836 B2 | 10/2020 | Manuel et al. | |
| 11,116,300 B2 | 9/2021 | Mody | |
| 11,121,735 B2 | 9/2021 | Kim et al. | |
| 11,569,862 B1 | 1/2023 | Yoon | |
| 11,647,819 B2 * | 5/2023 | Mody | A45C 11/00 224/191 |
| 11,689,239 B2 | 6/2023 | Dannenberg et al. | |
| 11,818,851 B2 | 11/2023 | Wang et al. | |
| 2003/0189759 A1 | 10/2003 | Kim et al. | |
| 2007/0227923 A1 | 10/2007 | Kidakarn | |

(Continued)

FOREIGN PATENT DOCUMENTS

KR 20140005210 U 10/2014

*Primary Examiner* — Fred A Casca
(74) *Attorney, Agent, or Firm* — Wood, Phillips, Katz, Clark, & Mortimer

(57) ABSTRACT

Disclosed herein is a case or cover for protecting the housing of a folding portable electronic device such as a smart phone with a folding display. The case or cover includes a first and second portion hingedly joined to a hinge protecting portion. The case or cover allows the encase phone to lie flat when in the fully opened position and included thinner first and second case portions proximate to the hinge cover to minimize the gaps between the case portions during the transition from a fully open to a fully closed position.

12 Claims, 17 Drawing Sheets

(56) References Cited

U.S. PATENT DOCUMENTS

| | | |
|---|---|---|
| 2007/0297125 A1 | 12/2007 | Maatta |
| 2013/0270980 A1 | 10/2013 | Hsu |
| 2018/0295736 A1* | 10/2018 | Cavenagh ............... A45C 11/00 |
| 2020/0352045 A1 | 11/2020 | Wang et al. |
| 2023/0102883 A1 | 3/2023 | Chung |
| 2023/0300228 A1* | 9/2023 | Mody ................... H04M 1/022 |
| | | 455/566 |

* cited by examiner

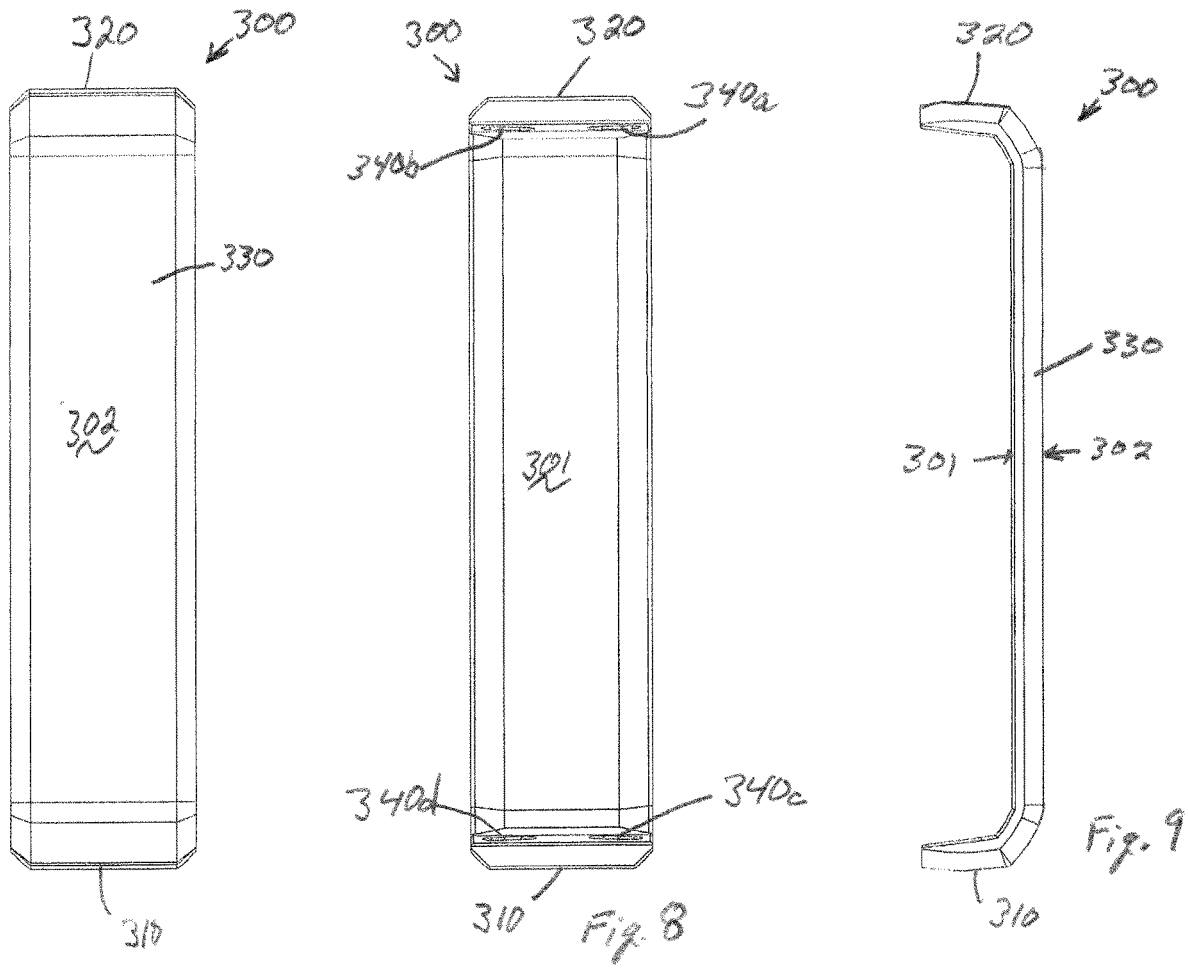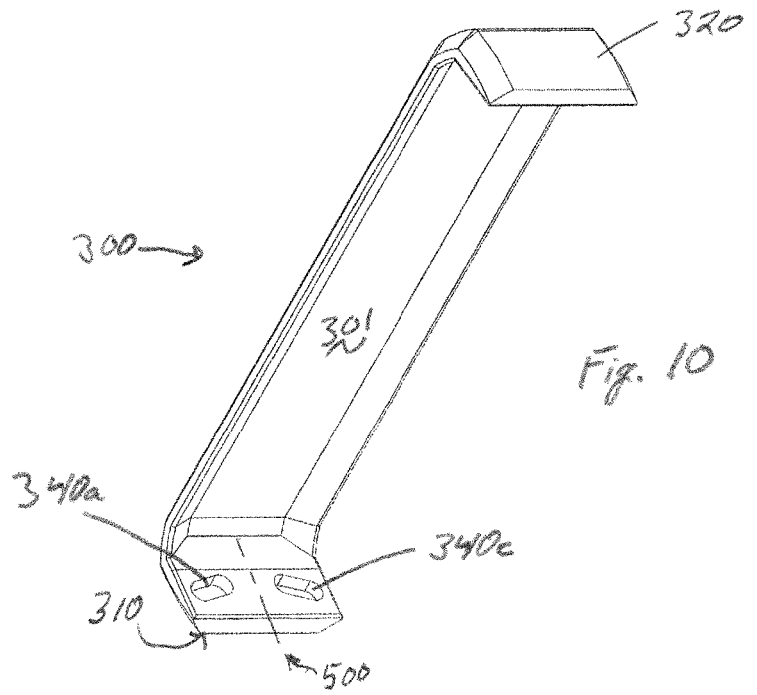

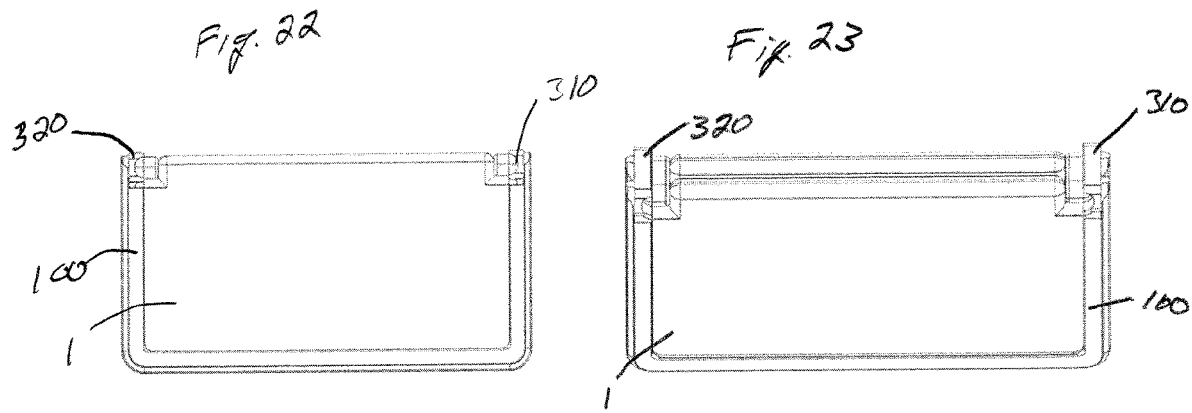
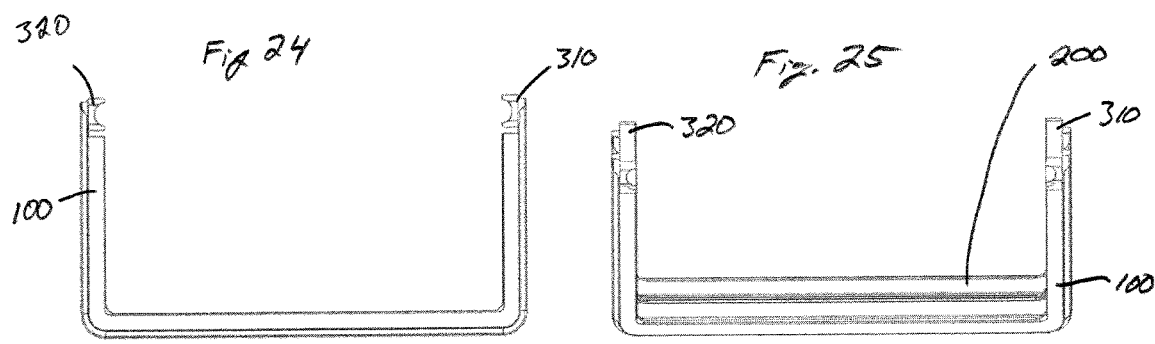
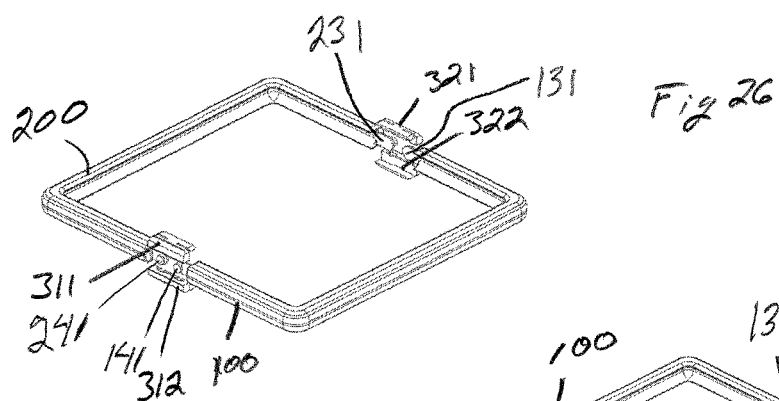
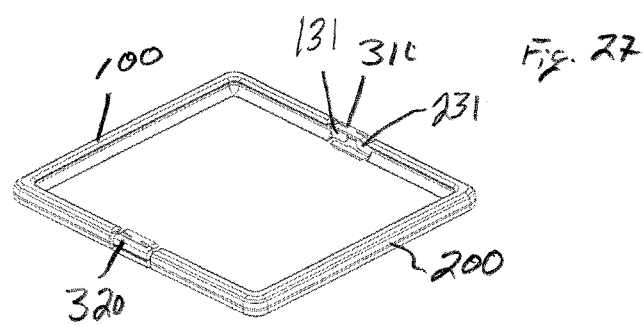

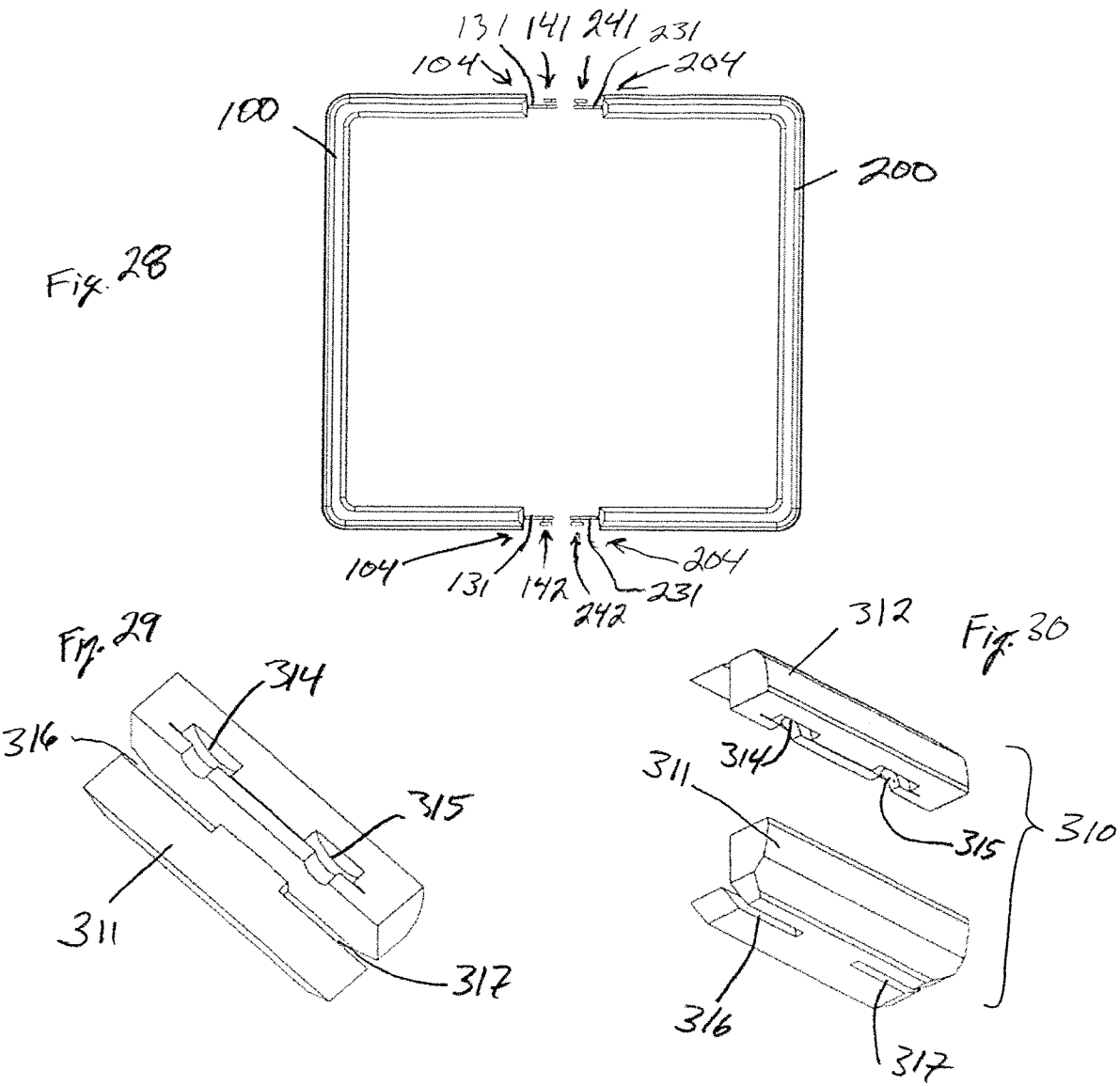

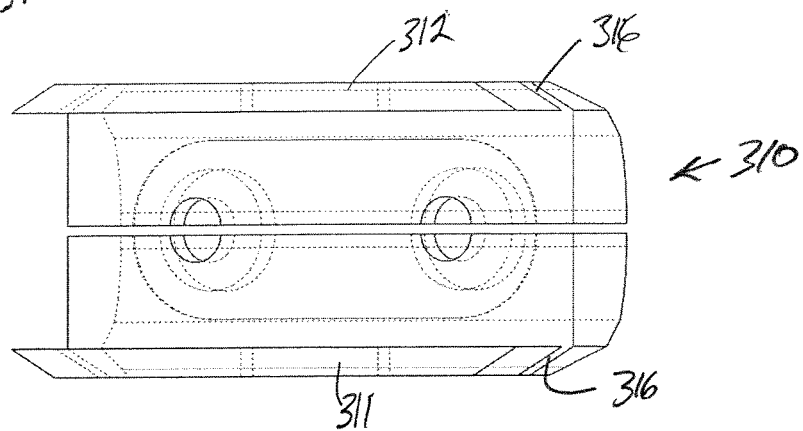
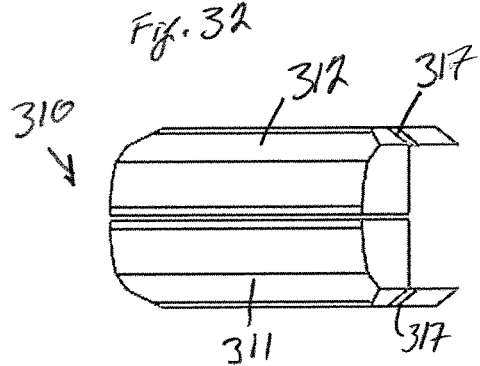
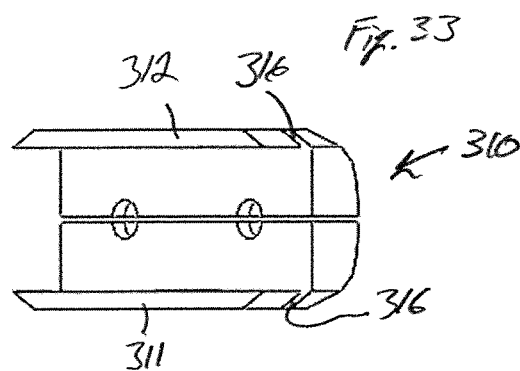
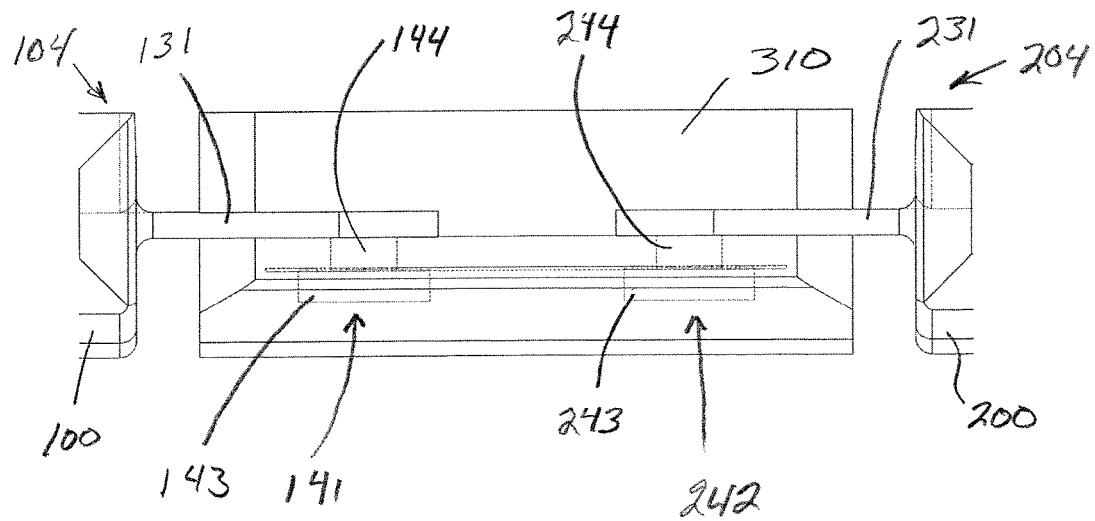

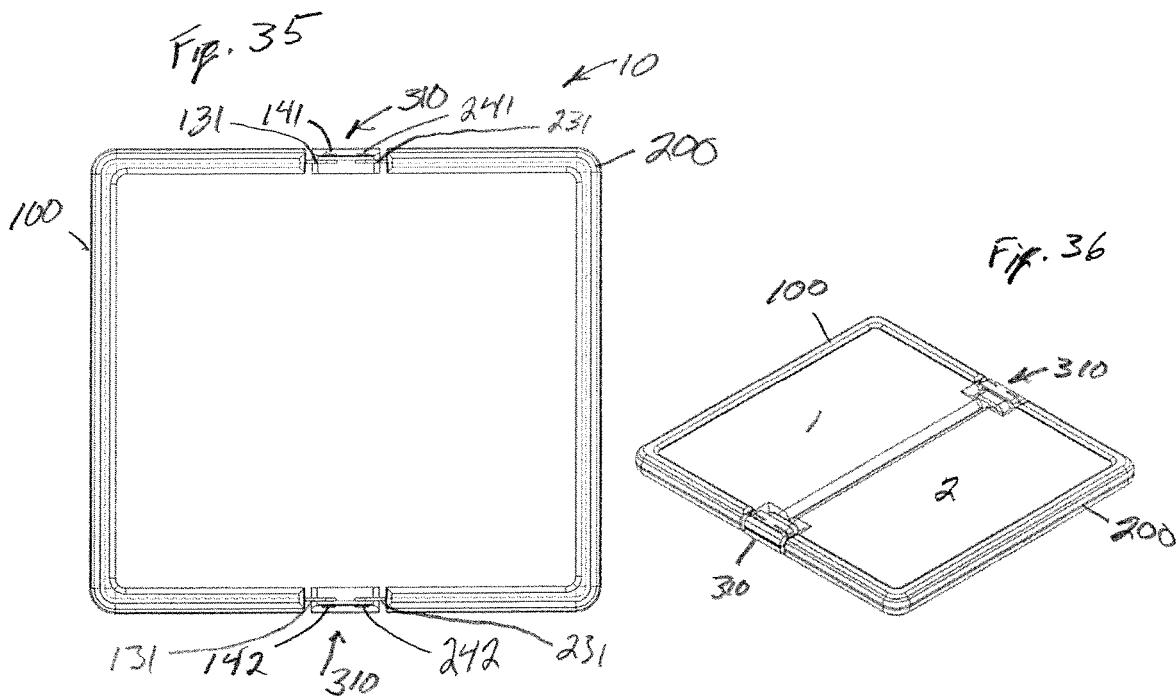
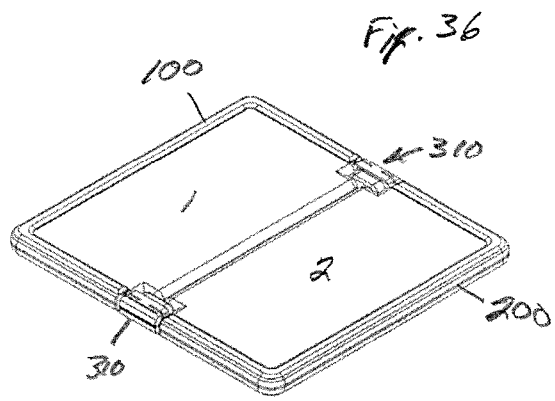
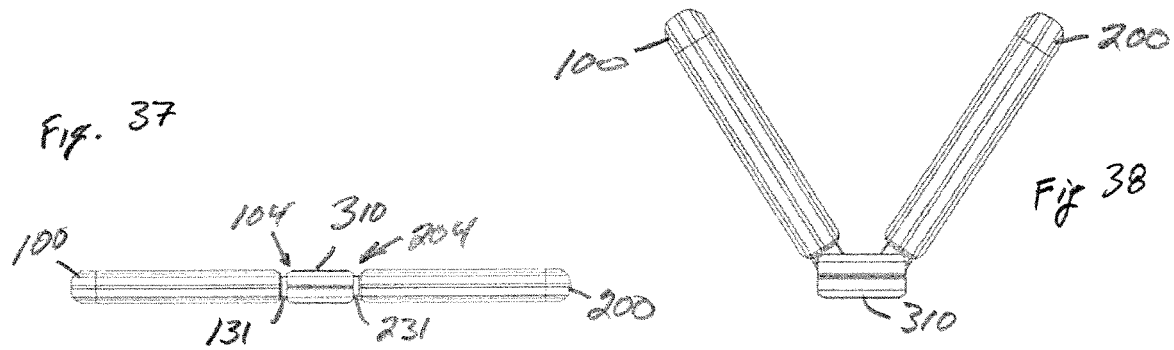
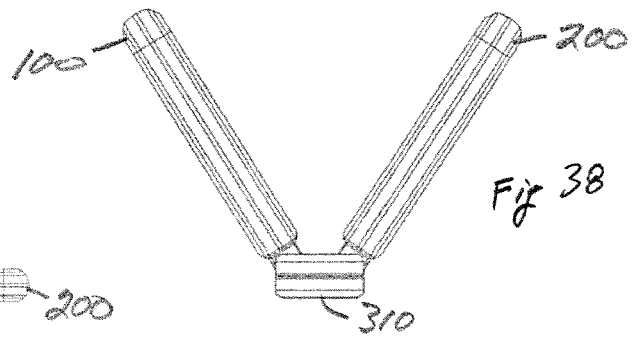
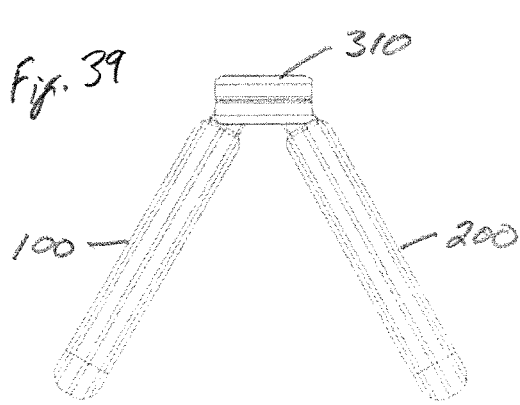
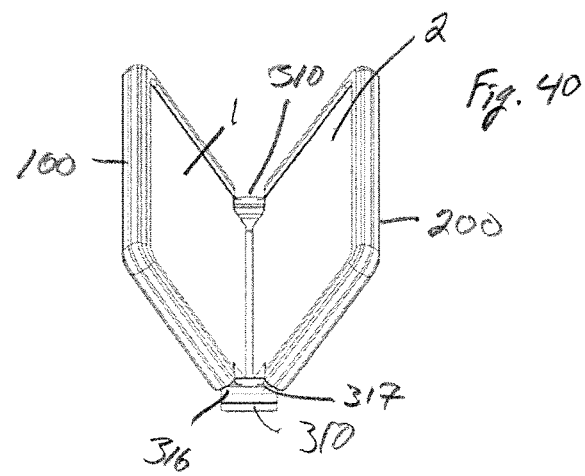

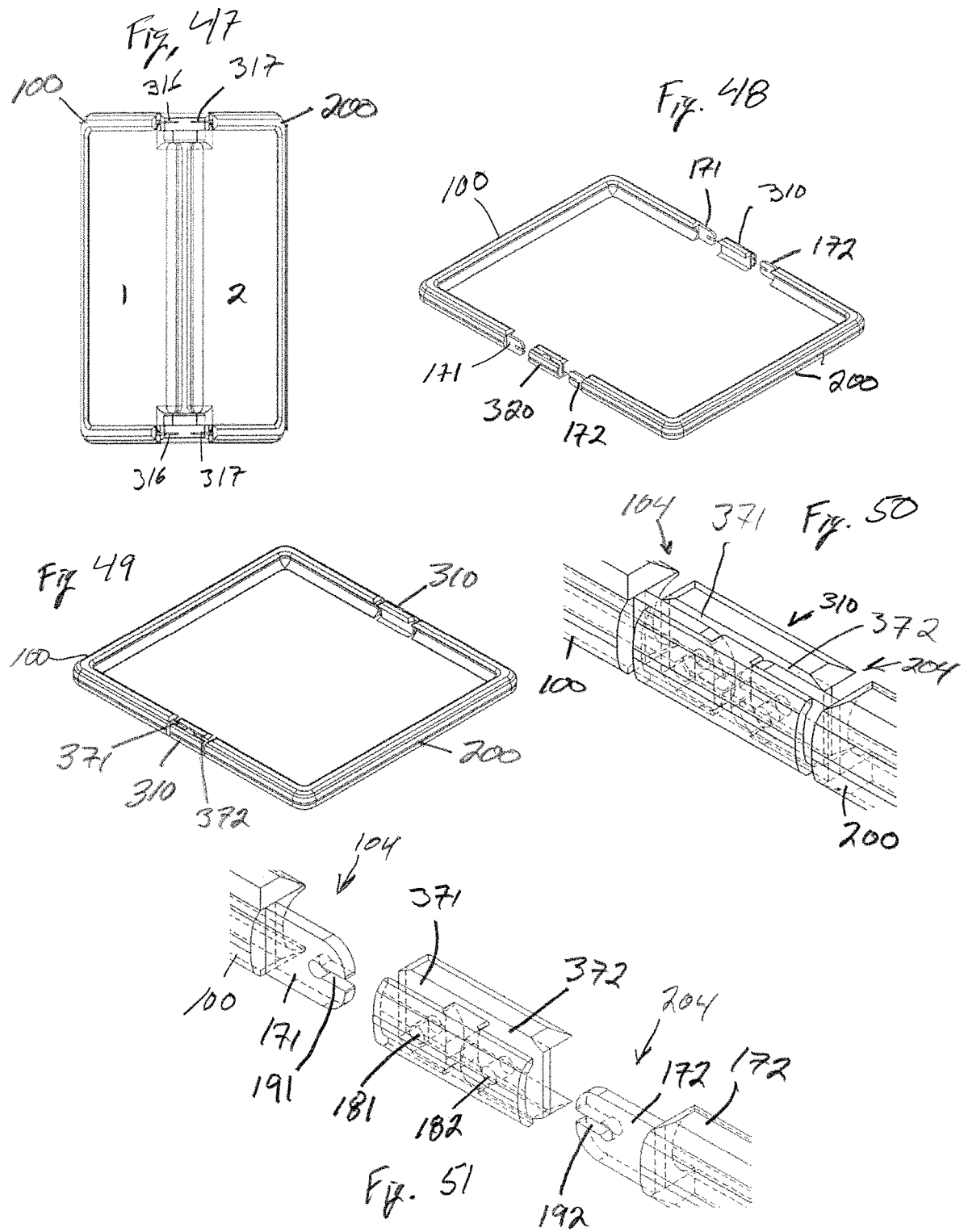

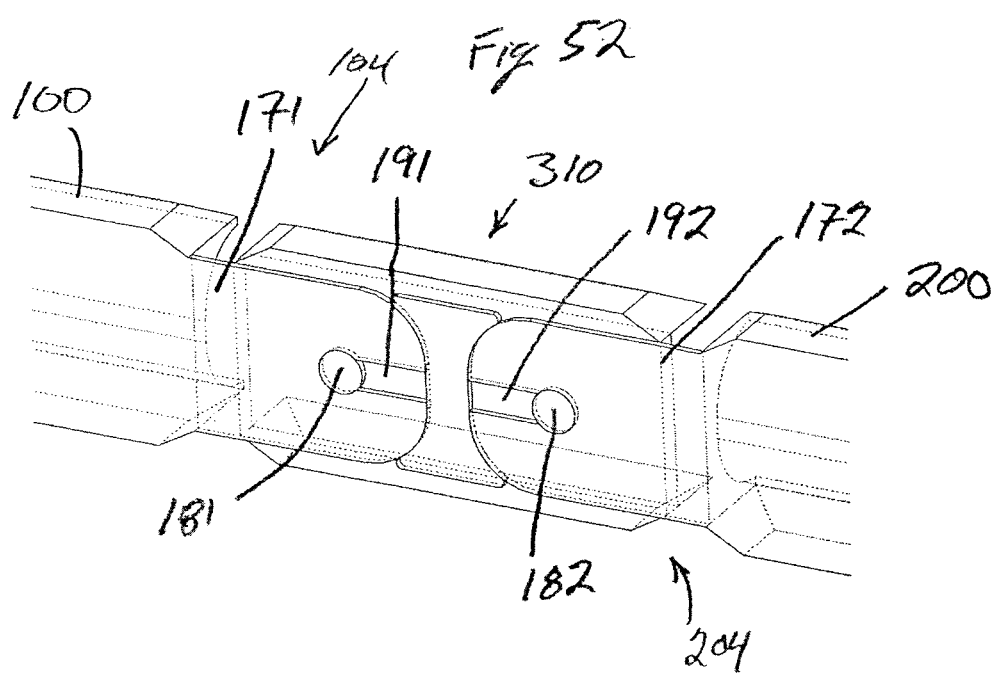

COVER FOR FOLDING PORTABLE ELECTRONIC DEVICE WITH HINGE PROTECTION

BACKGROUND OF THE INVENTION

Portable electronic devices such as cellular phones need protection from impact. Recently, cellular phones have been developed that include a display or screen that spans across two sections of the device. The sections are hingedly joined, allowing the phone and the screen or display to fold. It is desirous to protect not only the two sections of the phone, but also the hinge area. Additionally, it is desirous to protect the hinge area at all aspects of the closing or opening motion. These hingedly joined devices may also move or fold in two directions. Put another way, the devices may have movement on either side of the open 180 degree position or plane.

FIELD OF THE INVENTION

The invention relates to cases or covers for portable electronic devices such as cellular phones, tablets, and other portable electronic devices. Such covers are commonly accessories for a mobile phone or tablet, and not the housing of the device. More specifically, the invention applies to cases or covers for portable electronic devices that fold such as flip phones and cellular phones that fold.

BACKGROUND ART

Cases for portable electronic devices such as cell phones and tablets are well known. Such devices typically include a plurality of side or perimeter wall to surround the perimeter of the device, and a back wall, the walls defining a well, plenum, or space for receiving a portable electronic device or a portion of the portable electronic device while allowing users to view and interact with the device's display or screen. The cases are typically made of a material such as PVC or TPU at a thickness that does not conveniently allow for folding over and maintaining the shape of the well.

Phone manufacturers have introduced phones into the market that include two portions that fold over one another at a central hinge area. These phones are similar to flip phones that were popular prior to the introduction of the smartphone. The new folding phones, unlike the flip phones, include a display that spans and extends across both portions of the phone. The display hinges or folds in a central location. A result of this, there is a hinge area of the phone that needs protection in both the closed and open position.

Some prior art cases for flip phones of the prior generation utilized elastic panels to address the need to protect the hinge area of the phone when folded or closed while allowing the hinge area of the case to adapt to the shorter dimension of the phone hinge area when the phone is open. However such elastic panels do not provide good protection when compared to TPU or PVC areas of the case. Further, the flip phones were not designed to lie flat when fully open as they did not feature a continuous display across both portions of the phone. Nor did a case for a flip phone need to accommodate a phone that lies flat when fully open.

The present invention seeks to provide superior protection for the folding phones of the present generation with continuous displays while allowing the encased phone to lie flat when in the fully opened position.

SUMMARY OF THE INVENTION

The invention is a cover or case for a folding portable electronic device. The invention is a case that goes over the enclosure or housing of the portable electronic device as opposed to the enclosure or housing encasing, surrounding, or containing the electronics of a device as provided by the manufacturer of the device. Such add-on cases are designed to protect the portable electronic device and housing or enclosure from damage from impact as such enclosures are often made of glass or plastics that do not respond well to impacts.

Some embodiments of the invention disclosed herein are a three-part case designed to protect the phone and hinge area of the phone in the open position, the closed position, as well as when the phone is in intermediate positions between open and closed. The hinge cover portion of the case is allowed to remain in close proximity to the phone body cover positions of the case by judicious selection of case dimension, including areas of reduced thickness for the cover portions proximate to the hinge portion, the profile of the inner side of the hinge cover portion, and the width of the hinge cover portion. The case also allows the encased phone to lie flat on the case's back surface when placed open on a flat surface such as a tabletop. This lie flat feature is advantageous when the encased device is placed on a flat surface and the user interacts with the display, as the device will not wobble as both phone portion covers are in contact with the tabletop or other surface at the same time while the hinge protecting portion of the cover is either also in contact with the table top, or is positioned above the tabletop so as not to act as a pivot or fulcrum.

In other embodiments, the invention is a case for folding tablets, phones, or other display products that allow for movement or folding in both sides of a 180 degree plane. Such embodiments may have a different structure at the hinges to allow for movement in both directions about the hinge. For example, such embodiments may have hinge caps or protectors at the sides of the case or device and not have a structure that joins the hinge protectors to protect the hinge, as the hinge moves in both directions of rotation.

In one form, the invention is directed to a case for protecting the housing of a portable electronic device. The case includes a first cover for covering a first portion of the portable electronic device, a second cover for covering a second portion of the portable electronic device, and a hinge cover for covering a portion of a hinge of the portable electronic device. The first cover has a first cover perimeter wall and the second cover has a second cover perimeter wall. The first cover includes a first cover back wall that spans between the first cover perimeter wall. The first cover back wall has an area of reduced thickness between a first cover back wall inner surface and a first cover back wall outer surface. The second cover has a second cover back wall spanning the second cover perimeter wall. The second cover back wall has an area of reduced thickness between a second cover back wall inner surface and a second cover back wall outer surface. One of the first cover perimeter wall or hinge cover includes a first protrusion. One of the second cover or hinge cover has a second protrusion. The other of the first cover perimeter wall or the hinge cover includes a first slot to accept the first protrusion. The other of the second cover perimeter wall or the hinge cover includes a second slot to accept the second protrusion.

In one form, the hinge cover overlies at least a portion of the first cover back wall area of reduced thickness and at least a portion of the second cover back wall area of reduced thickness when the portable electronic device is in an open position.

In one form, the first slot and second slot are obround.

In one form, at least one slot is an aperture.

In one form, the first slot and second slot are positioned on one of a lateral portion of the hinge cover or the first cover perimeter wall and the second cover perimeter wall.

In one form, a back outer surface of the hinge cover is even with the first cover back wall outer surface when the portable electronic device is in the open position.

In one form, the invention is directed to a case for covering at least a portion of the housing of a portable electronic device. The portable electronic device has a first portion hingedly attached to a second portion. The portable electronic device has a closed position and an open position. The case has a corresponding open position and a closed position. The case includes a first cover for covering a first portion of the portable electronic device, a second cover for covering a second portion of the portable electronic device, and a hinge cover for covering a portion of a hinge of the portable electronic device. The first cover has a first cover perimeter wall and the second cover has a second cover perimeter wall. The first cover includes a first cover back wall spanning between the first cover perimeter wall. The second cover includes a second cover back wall spanning the second cover perimeter wall. The first cover back wall includes a first cover back wall first exterior surface and a first cover back wall second exterior surface. The second cover back wall includes a second cover back wall first exterior surface and a second cover back wall second exterior surface. The hinge cover includes a hinge cover back wall having a hinge cover back wall exterior surface. The hinge cover back wall overlies at least a portion of the first cover back wall and at least a portion of the second cover back wall when the case is in the open position. At least a portion of the first cover back wall first exterior surface is level with the hinge cover back wall exterior surface when the case is in the open position.

In one form, one of the hinge cover or the first cover perimeter wall includes a first protrusion and a second protrusion and an other of the first cover perimeter wall or the hinge cover includes a first receiver to receive the first protrusion and a second receiver to receive the second protrusion.

In one form, one of the hinge cover of the second cover perimeter wall includes a third protrusion and a fourth protrusion and an other of the second cover perimeter wall or the hinge cover includes a third receiver to receiver the third protrusion and a fourth receiver to receive the fourth protrusion.

In one form, the first protrusion and the second protrusion align to form a first axis and the third and fourth protrusion align to form a second axis. The first cover rotates about the first axis with respect to the hinge cover and the second cover rotates about the second axis with respect to the hinge cover when the case is moved from the open to closed position.

In one form, the first receiver and the second receiver are obround.

In one form, the hinge cover has a first lateral portion and a second lateral portion. One of the first protrusion or first receiver is located on the first lateral portion and an other of the first receiver or first protrusion is located on the second lateral portion. The first lateral portion and second lateral portions oppose at least a portion of the first cover perimeter wall.

In one form, the invention is directed to a case for covering at least a portion of the housing of a portable electronic device. The case includes a first cover for covering at least a portion of a first portion of the housing, a second cover for covering at least a portion of a second portion of the housing, and a third cover for covering at least a third portion of the housing. The first cover is pivotably attached to the third cover and the second cover is pivotably attached to the third cover. The first cover includes a first cover back exterior surface, the second cover includes a second cover back exterior surface, and the third cover includes a third cover back exterior surface. The first cover back exterior surface, second cover back exterior surface, and third cover back exterior surface are co-planar when the case is in a fully open position.

In one form, at least a portion of the first cover back exterior surface overlies at least a first portion of the third cover back exterior surface and at least a portion of the second cover back exterior surface overlies at least a second portion of the third cover when the case is in a fully open position.

In one form, one of the first cover or third cover includes a first post, and an other of the first cover or third cover includes a first post accepting surface. One of the second cover or third cover includes a second post and an other of the second cover or third cover includes a second post accepting surface.

In one form, the first post accepting surface allows the first cover to pivot and translate with respect to the third cover In one form, the second post accepting surface allows the second cover to pivot and translate with respect to the third cover.

In one form, the first cover back has a first cover back area of reduced thickness and the second cover back has a second cover back area of reduced thickness. The third cover overlies at least a portion of the first cover back area of reduced thickness and at least a portion of the second cover back area of reduced thickness when the case is in a fully open position.

In one form, the first post accepting structure includes arcuate profiles.

BRIEF DESCRIPTION OF THE DRAWINGS

FIG. 7 is a back or outer side elevational view of the hinge cover of the present invention.

FIG. 8 is an inner side elevational view of the hinge cover of the present invention.

FIG. 9 is side elevational view of the hinge cover of the present invention.

FIG. 10 is an inner side perspective view of the hinge cover of the present invention.

FIG. 22 is a plan view of a case in a closed position with a portable electronic device within the case.

FIG. 23 is a perspective view of a case in a closed position with a portable electronic device within the case.

FIG. 24 is a plan view of the case in a closed position.

FIG. 25 is perspective view of a case in a closed position'

FIG. 26 is a perspective view of a case in a flat open position showing the connectors separated.

FIG. 27 is a perspective view of a case in a flat open position.

FIG. 28 is a plan view of the first and second covers of a case in a flat open position.

FIG. 29 is a perspective view of one portion of a connector.

FIG. 30 is an exploded view of two portions of a connector.

FIG. 31 is a perspective view of a connector showing internal structure.

FIG. 32 is a perspective view of an outer surface of a connector.

FIG. 33 is a perspective view of an inner surface of a connector.

FIG. 34 is a top cutaway view of a connector and proximal portions of the first and second covers.

FIG. 35 is a top cutaway view of a case in an open position.

FIG. 36 is a perspective view of a case in an open position with a device in the case.

FIG. 37 is a side elevational view of a case in an open position exhibiting the connectors and back outer surfaces of the covers being co-planer in an exterior surface.

FIG. 38 is a side elevational view of a case in a position between open and closed, the covers rotated above the connectors.

FIG. 39 is a side elevational view of a case in a position between open and closed with the covers rotated below the connectors.

FIG. 40 is a perspective view of a case in a position between open and closed with a device in the case.

FIG. 47 is a top view of a case with a device in the case in a partially closed position.

FIG. 48 is a perspective exploded view of case first and second covers and two connectors.

FIG. 49 is a perspective view of a case in a flat open position.

FIG. 50 is a detailed perspective view a connector and the proximal ends of the perimeter walls of a case showing internal details.

FIG. 51 is a detailed perspective exploded view a connector and the proximal ends of the perimeter walls of a case showing internal details.

FIG. 52 is a detailed perspective sectional view of the assembly shown in FIG. 50.

DETAILED DESCRIPTION OF THE PREFERRED EMBODIMENT

Figure 19:
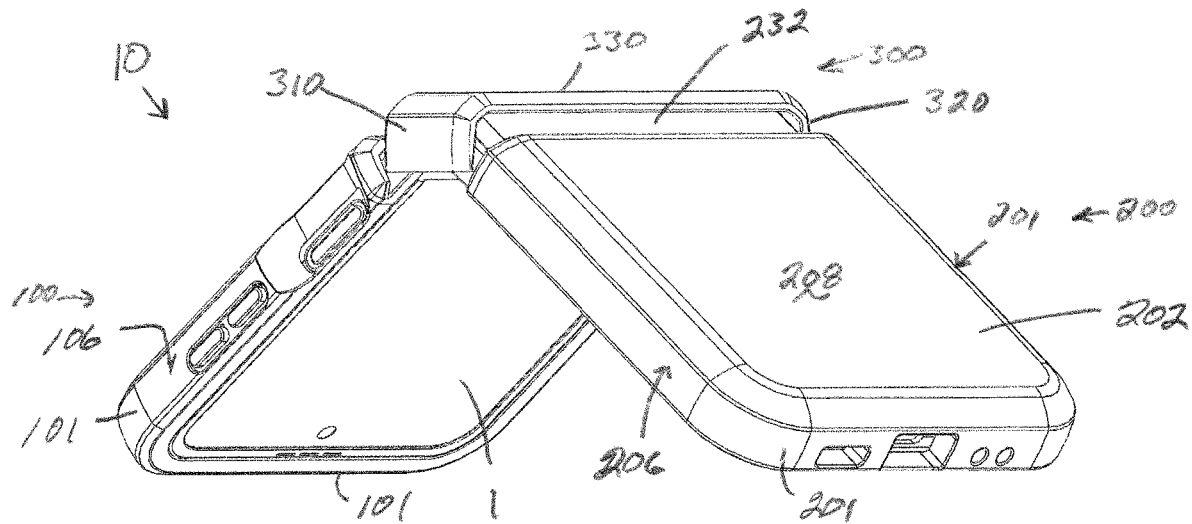
FIG. 19 is a back side perspective view of the case of the present invention with a cellular phone in the well of the case.
Figure 20:
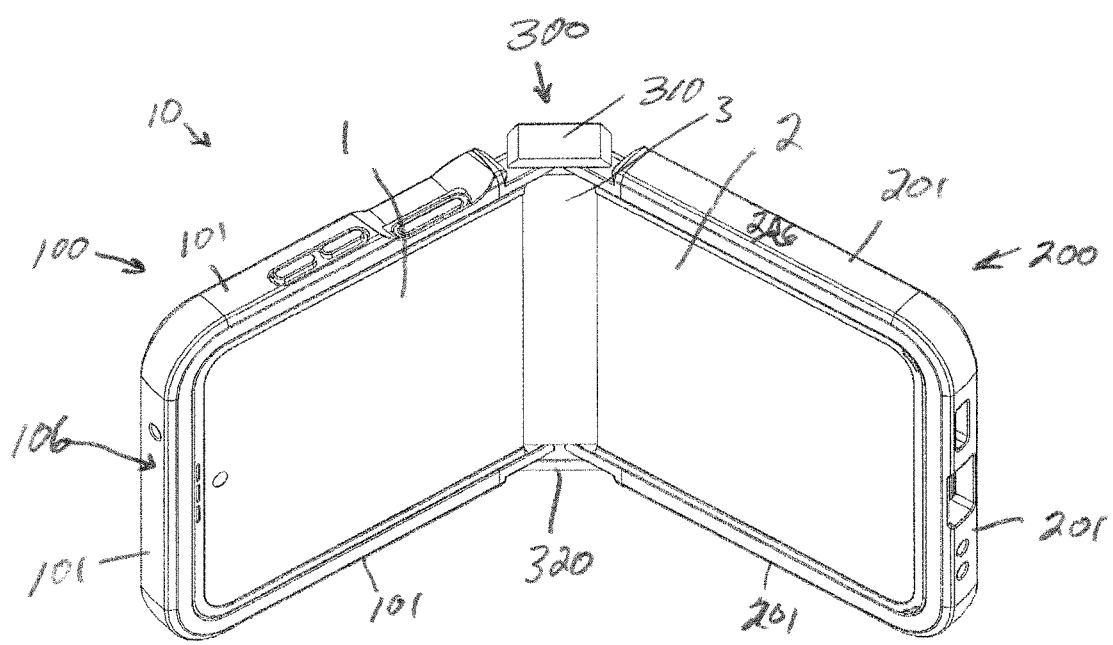
FIG. 20 is a front side perspective view of the case of the present invention with a cellular phone in the well of the case.
Figure 21:
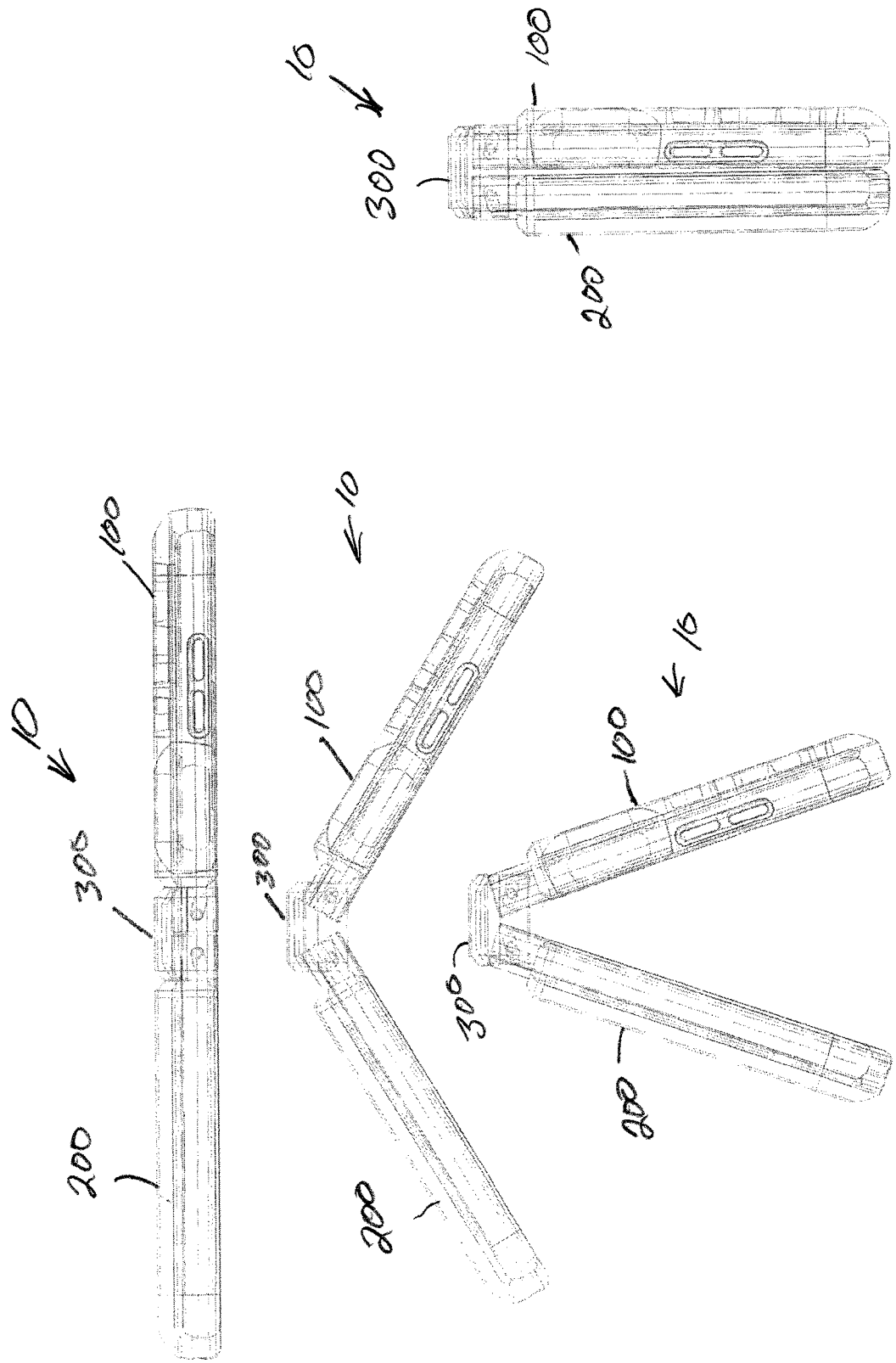
FIG. 21 is a series progression showing the slots and posts as the case is transitioned from an open to closed position.
Figure 41:
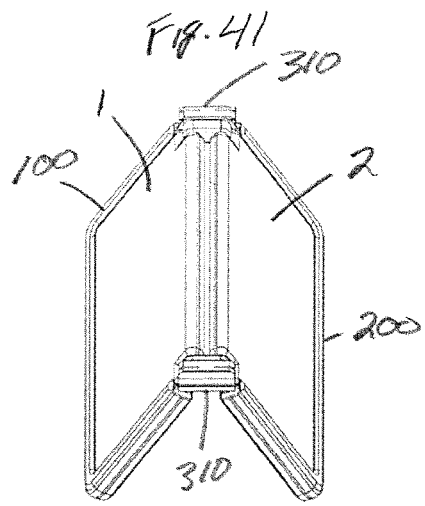
FIG. 41 is a perspective view of a case in a position between open and closed with the covers rotated below the connectors and a device in the case.
Figure 42:
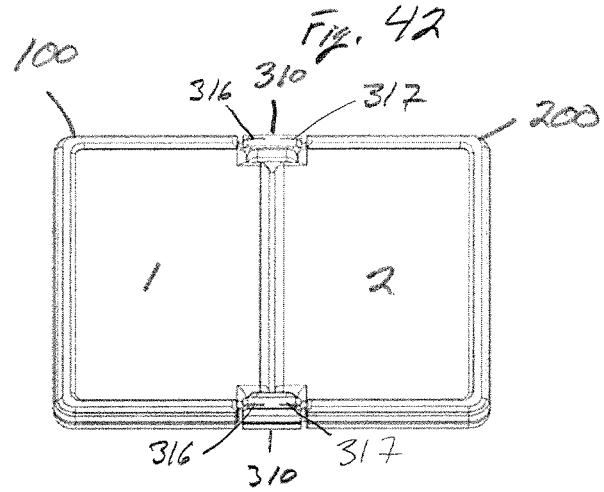
FIG. 42 is a perspective view a case in a flat open position with a device in the case.
Figure 43:
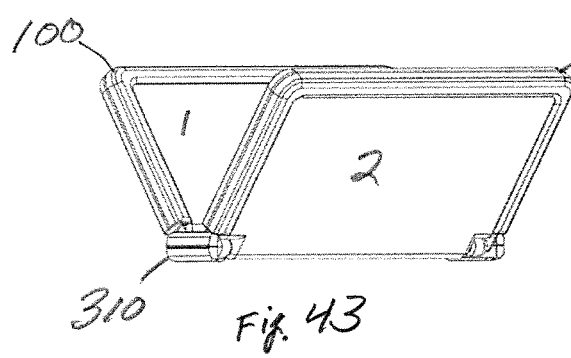
FIG. 43 is a perspective view of a case in a position between open and closed with a device in the case, with the covers rotated above the connectors.
Figure 44:
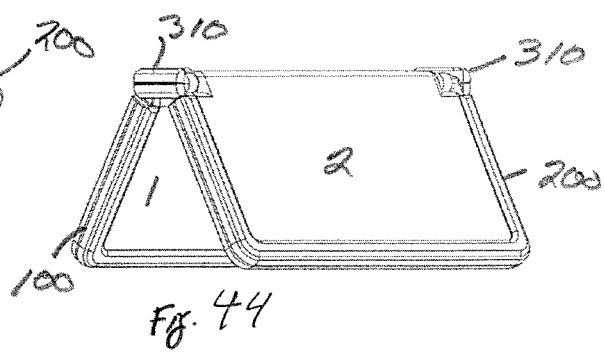
FIG. 44 is a perspective view of a case in a position between open and closed with a device in the case, with the covers rotated below the connectors.
Figure 45:
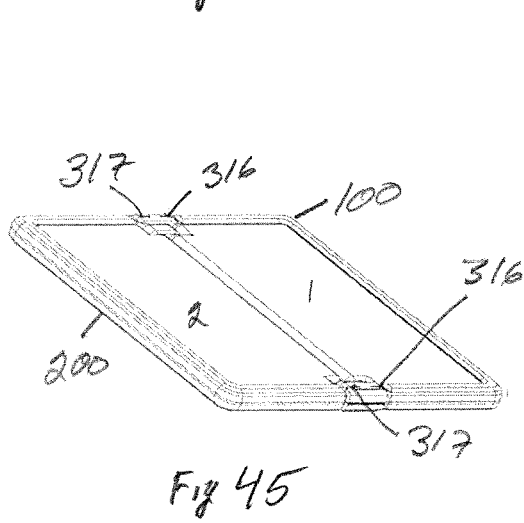
FIG. 45 is a perspective view a case in a flat open position with a device in the case.
Figure 46:
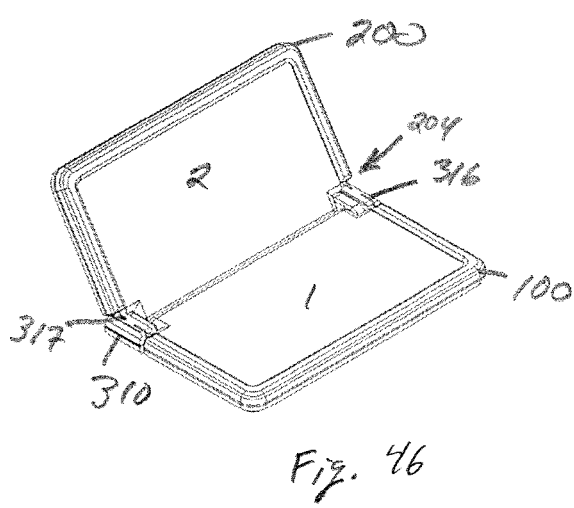
FIG. 46 is a perspective view of a case with the first portion in a flat position and the second portion in a partially upraised position, with a device in the case.

With reference to the figures, some embodiments of the invention herein include a case 10. The case 10 includes a first cover 100 for fitting upon or over a first portion 1 of a portable electronic device such as a phone, and a second cover 200 for fitting upon or over a second portion 2 of a portable electronic device such as a phone. The figures generally show the case without a phone or other device, although a case with a phone positioned inside the case is shown in FIGS. 19 and 20. It is understood that when referring to a phone in this specification, a phone is an example of a portable electronic device, and that any portable electronic device may be substituted for the phone.

In some embodiments, when fitted on the phone, the first and second covers 100 and 200 move with the respective portions of the phone and the case 10 thereby takes on an open configuration when the phone is open, or a folded configuration when the phone is folded. FIGS. 15-18 and 21 are examples of such a transition from open to close, without the presence of the phone.

The case 10 in some embodiments further includes a hinge cover 300 hingedly attached to the first cover 100 and the second cover 200. The hinge cover 300 is positioned over or adjacent to the hinge area 3 of the phone. One skilled in the art will recognize that the phone may have a plurality of hinges located in the hinge area, or a single hinge. The hinge or hinges may be of any type used in the portable electronic industry.

In some embodiments the first cover 100 includes a well 110 for accepting a first portion 1 of the phone. The second cover 200 includes a well 210 for accepting a second portion 2 of the phone. The first cover 100 and second cover 200 are attached to each other by way of each cover having a connection to the hinge cover 300.

In some embodiments, the first cover 100 and second cover 200 may include similarly and similarly placed components that are related to the hinged movement of the case. In other embodiments, the first cover 100 and second cover

200 may include components that are different or have different placements or configurations.

In some embodiments the first cover 100 includes a perimeter wall 101 and a back wall 102. The perimeter wall 101 may be about at least a portion of the perimeter or side of the phone and sized to accept the same when the cover is on the phone. In some embodiments the perimeter wall 101 includes an inner surface 105. The inner surface 105 may be curved, dished, u-shaped, concave or any other shape to conform to the side of the phone or to retain the phone in the well of the first cover 100. The perimeter wall may also include an outer surface 106. The perimeter wall may be continuous or discontinuous.

In some embodiments, the back wall 102 may extend between portions of the perimeter wall to form a well 110 for accepting a first portion of the phone. The back wall 102 may include an inner surface 107 facing the phone or forming the back of the well 110, and an outer surface 108 facing outward or away from the phone or well.

In some embodiments, the first cover 100 may not have a back wall. Such embodiments are shown in FIGS. 22-52. In such embodiments, the first cover 100 includes a perimeter wall 101 about at least a portion of the perimeter of the device. The inner surface 105 may be curved, dished, u-shaped, concave or any other shape to conform to the side of the phone or to retain the cover 100 on the phone, or the phone within the bounds of the first cover 100. The perimeter wall may also include an outer surface 106. The perimeter wall may be continuous or discontinuous.

In some embodiments the first cover 100 includes a portion of reduced thickness 130. The portion of reduced thickness 130 may be located at an end proximate to the hinge of the phone. The portion of reduced thickness may include a perimeter wall portion of reduced thickness 131. Such perimeter wall portion of reduced thickness 131 may be on either or both lateral sides of the first cover 100. The perimeter wall portion of reduced thickness may be adjacent to or overlie the hinge or pivot axis of the phone when the cover is on the phone. In some embodiments the portion of the perimeter wall proximate to the hinge is not of reduced thickness.

In some embodiments the portion of reduced thickness may include a back wall portion of reduced thickness 132. The back wall portion of reduced thickness 132 may span between the perimeter wall portion of reduced thickness 131.

Figure 1:
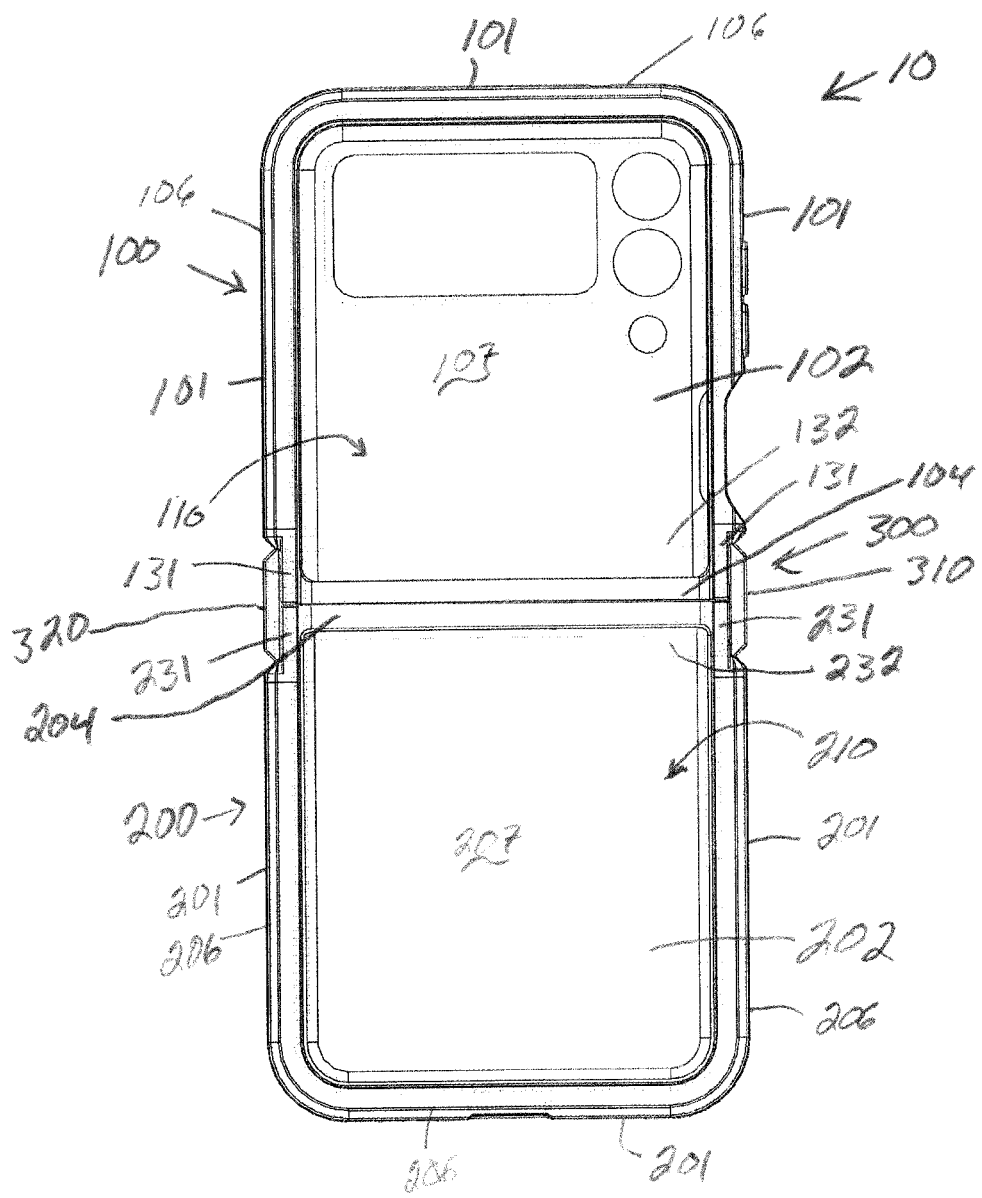
FIG. 1 is a front elevational view of the case of the present invention.
Figure 2:
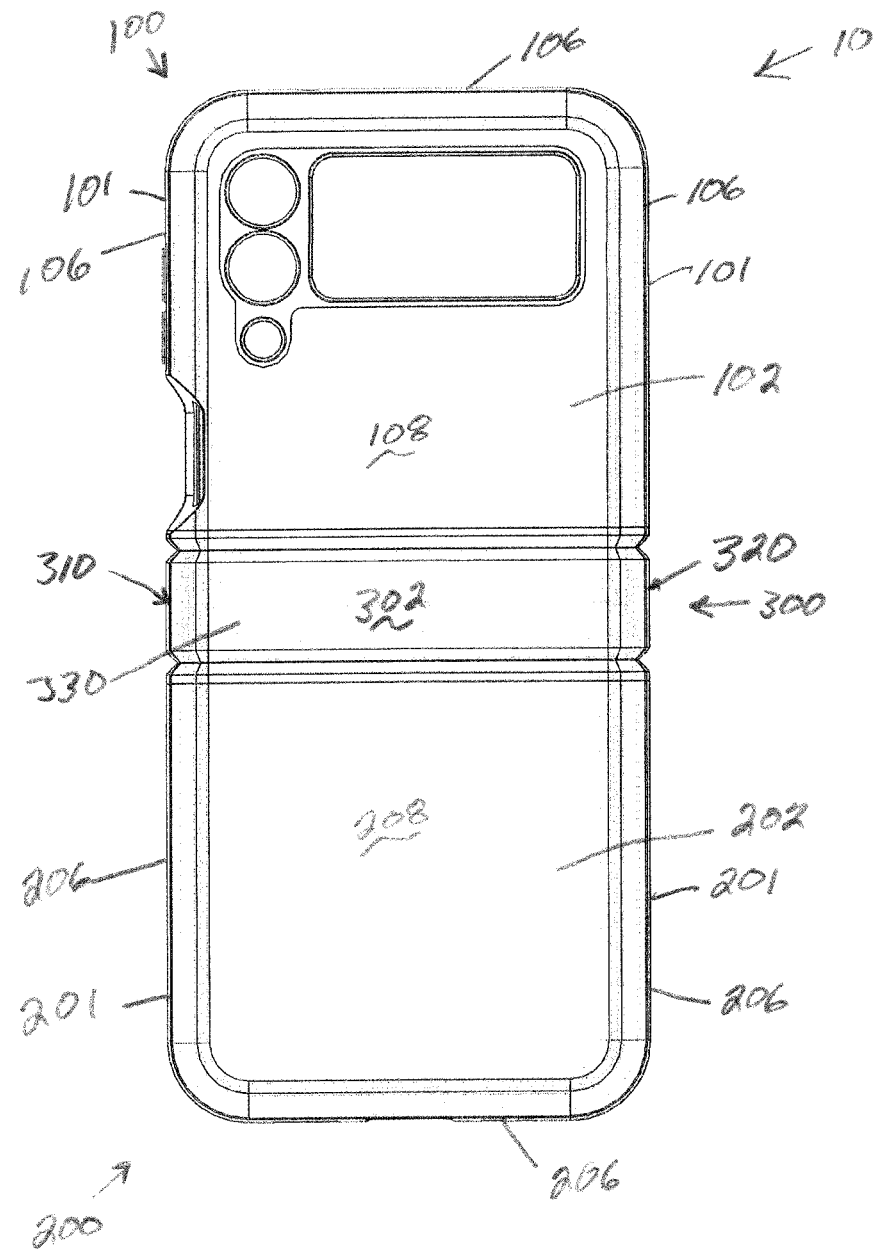
FIG. 2 is a back elevational view of the case of the present invention.
Figure 3:
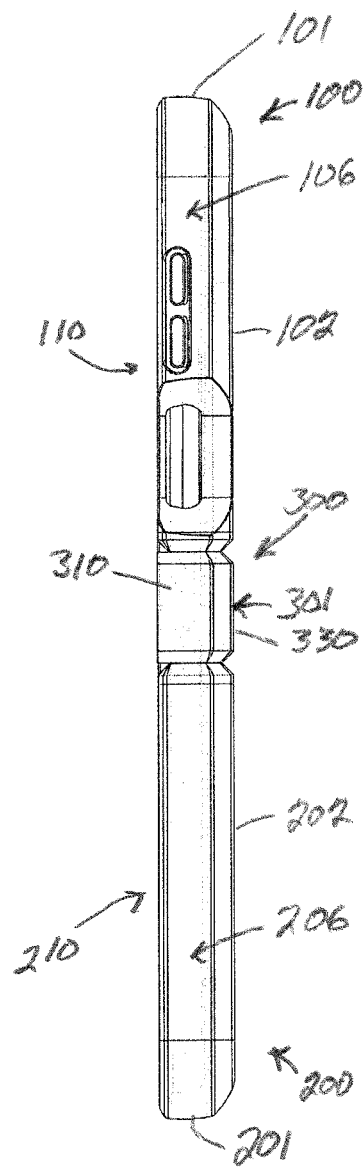
FIG. 3 is right side elevational view of the case of the present invention.
Figure 4:
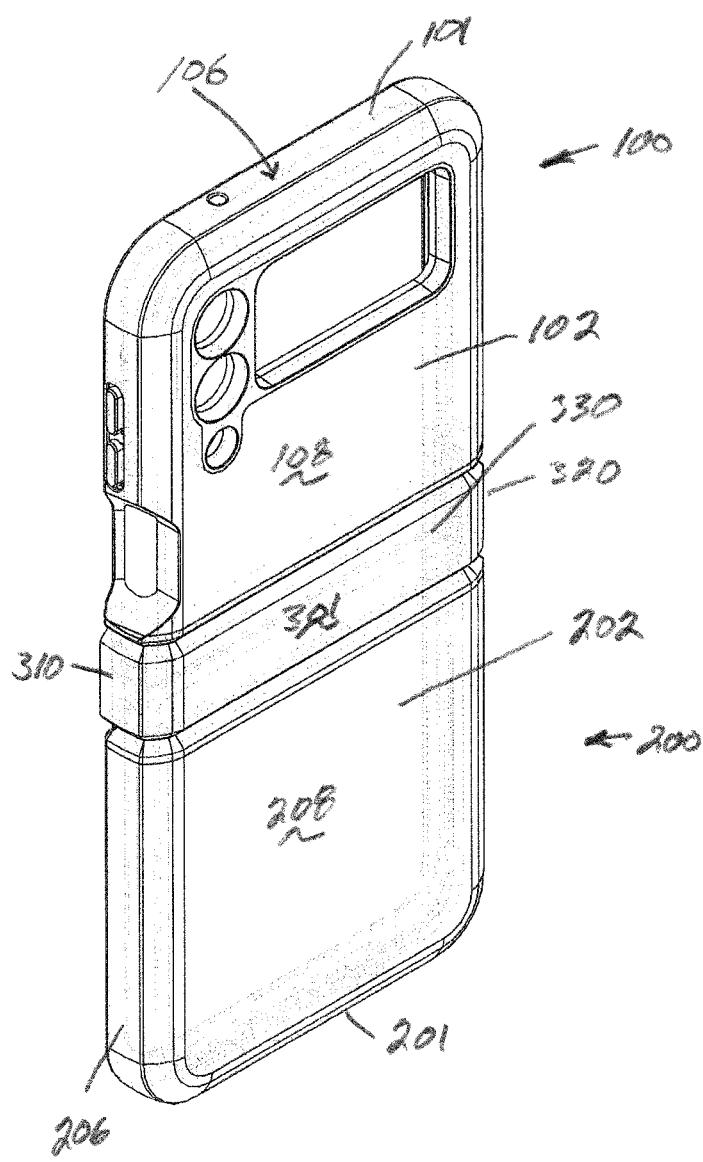
FIG. 4 is a right top back perspective view of the case of the present invention.
Figure 5:
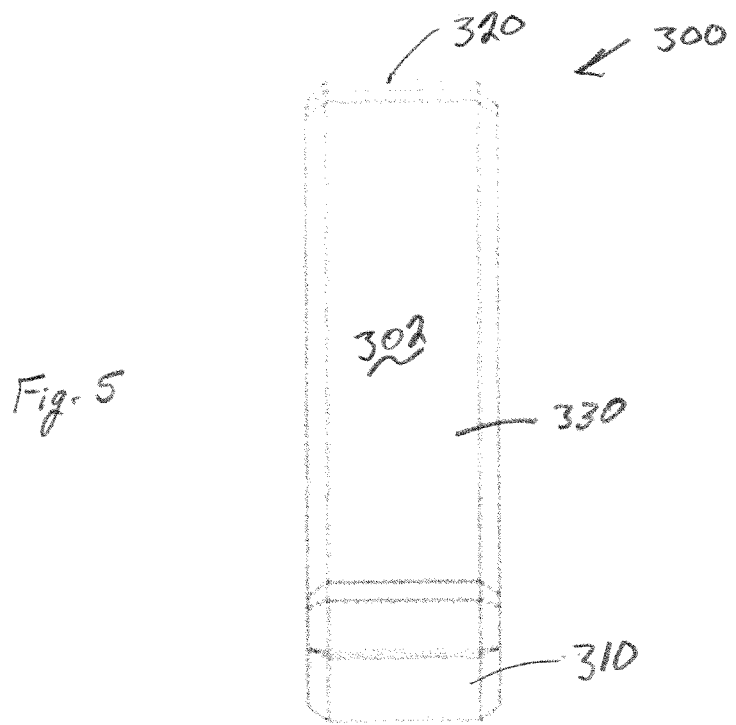
FIG. 5 is a right outer side perspective view of the hinge cover of the present invention.
Figure 6:
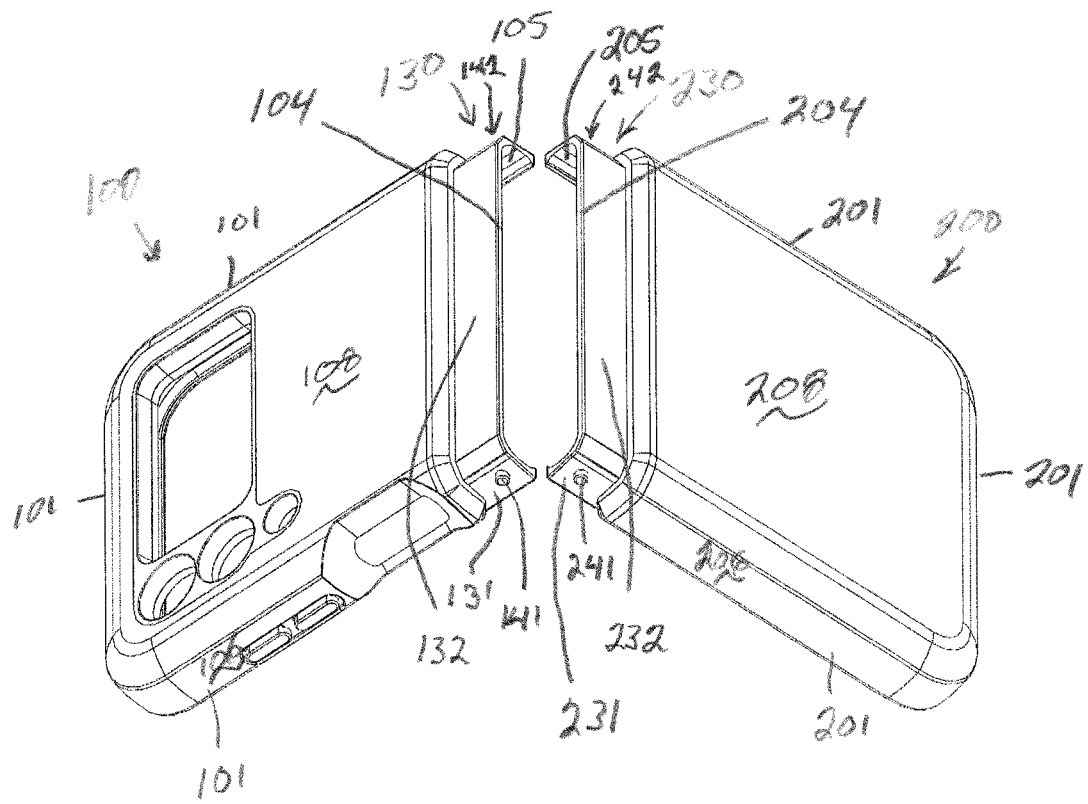
FIG. 6 is a right back side perspective view of the first and second covers of the present invention.
Figure 11:
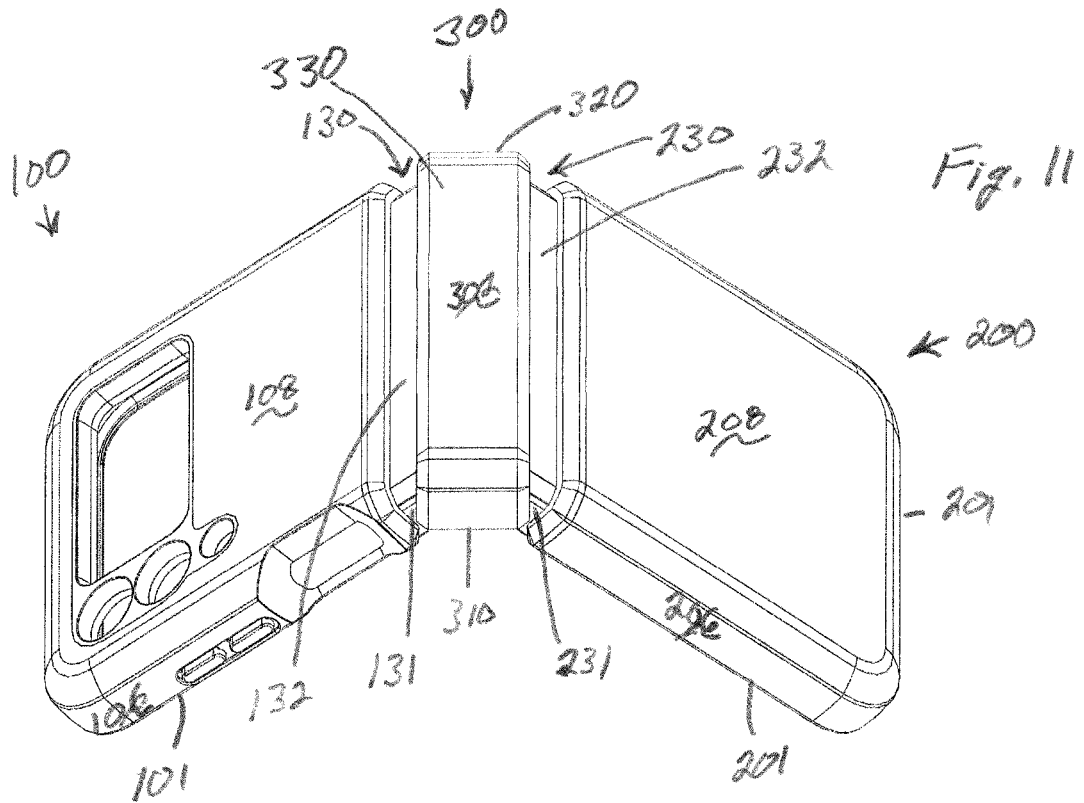
FIG. 11 is a right back side perspective view of the case of the present invention.
Figure 12:
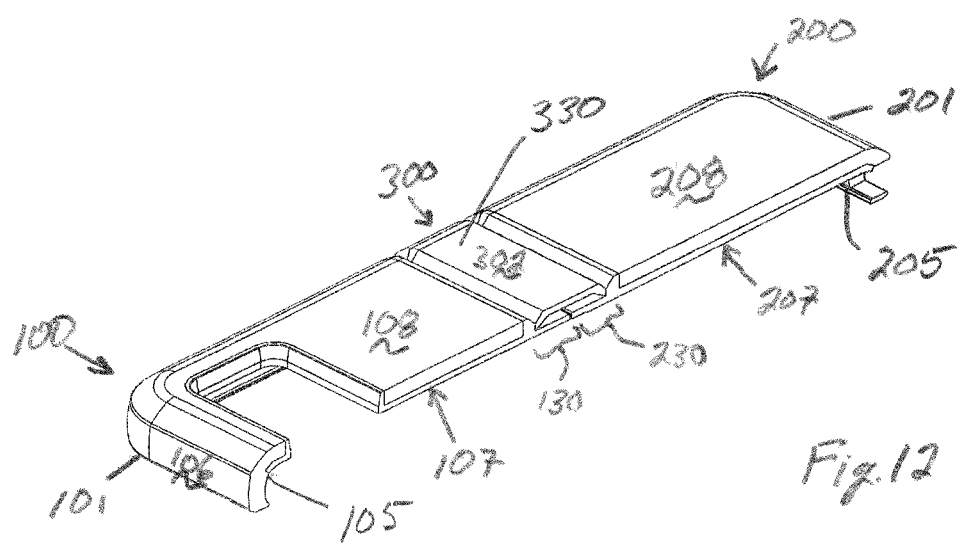
FIG. 12 is cross-sectional back side perspective view of the case of the present invention in a fully open configuration.
Figure 13:
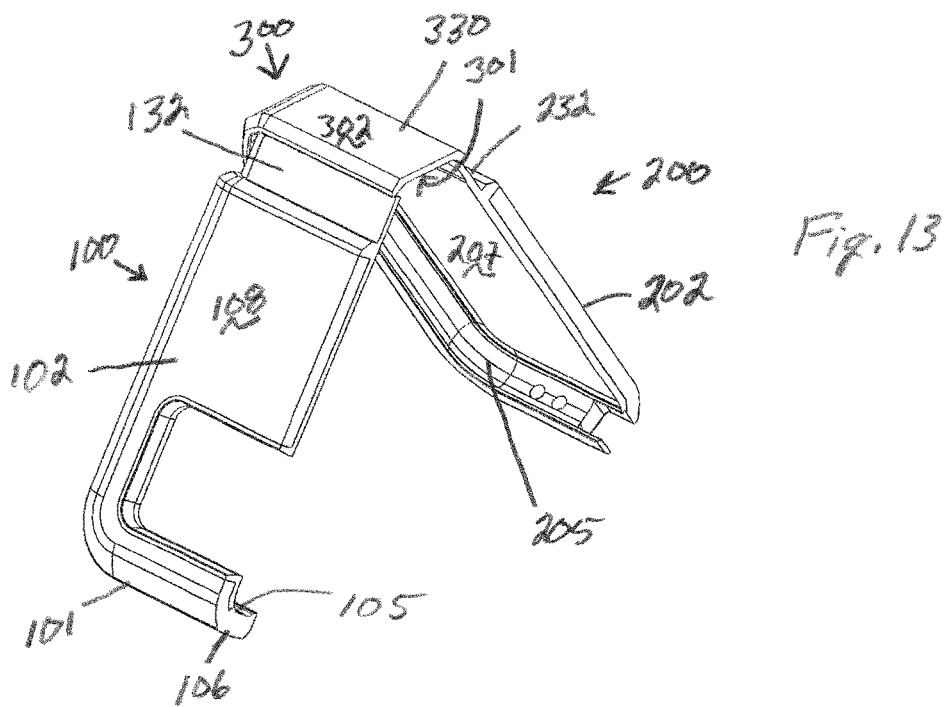
FIG. 13 is cross-sectional back side perspective view of the case of the present invention in a partially open configuration.

In some embodiments the first cover 100 includes at least one post 140, protrusion, boss, pin, or other structure to pivot upon. The post 140 is positioned to extend laterally from the side of the first cover 100. In some embodiments, the post 140 is positioned on the outer surface of the perimeter wall portion of reduced thickness 131. Such a post 140 is shown in FIG. 6. In some embodiments, the post 140, protrusion, boss, pin, or other structure to pivot upon is positioned adjacent to or overlies the pivot axis of the device or phone when the cover is on the device or phone. In some embodiments, the post 140 is positioned on a portion of the perimeter wall 101 proximate to the hinge of the phone, but the perimeter wall 101 is not of reduced thickness.

In some embodiments, the first cover 100 may include a second post 142 protrusion, boss, pin, or other structure to pivot upon. The second post 142 is positioned to extend from the perimeter wall portion of reduced thickness 131 on the other lateral side from the post 140. One skilled in the art will recognize such a position is obscured in FIG. 6. One skilled in the art will also recognize the second post 142 may be similarly positioned on a perimeter wall portion that is proximate to the hinge of the phone, but not of reduced thickness. The post 140 and second post 142 are axially aligned to form an axis about which the first cover 100 may pivot.

The first cover 100 includes a well 110 for accepting a first portion of the phone. The second cover 200 includes a well 210 for accepting a second portion of the phone. The first cover 100 and second cover 200 are attached to each other by way of each cover having a connection to the hinge cover 300.

In some embodiments, the first cover 100 and second cover 200 may include similarly and similarly placed components that are related to the hinged movement of the case. In other embodiments, the first cover 100 and second cover 200 may include components that are different or have different placements or configurations.

In some embodiments the second cover 200 includes a second cover perimeter wall 201 and a second cover back wall 202. The perimeter wall 201 of the second cover may be about at least a portion of the perimeter or side of the phone and sized to accept the portion of the phone when the cover is on the phone. The second cover 200 is to cover a second part or portion of the phone. In some embodiments the second cover perimeter wall 201 includes an inner surface 205. The inner surface 205 may be curved, dished, u-shaped, concave or any other shape to conform to the side of the phone or to retain the second part or portion of phone in the well of the second cover 200. The perimeter wall may also include an outer surface 206. The perimeter wall may be continuous or discontinuous.

The back wall 202 of the second cover may extend between portions of the second cover perimeter wall 201 to form a well 210 for accepting a second portion of the phone. The back wall 202 may include an inner surface 207 facing the phone or forming the back of the well 210, and an outer surface 208 facing outward or away from the phone or well.

In some embodiments, the second cover 200 does not include a back wall. Such embodiments are exemplified in FIGS. 22-52. However, one will recognize that the covers shown in FIGS. 1-21 may also not have back walls and have features shown in any of the figures. In such embodiments as shown in FIGS. 22-52, the second cover 200 includes a perimeter wall 201 about at least a portion of the perimeter of the device or phone. The inner surface 205 may be curved, dished, u-shaped, concave or any other shape to conform to the side of the phone or to retain the second cover 200 on the phone, or the phone within the bounds of the second cover 200. The second cover perimeter wall 201 may also include an outer surface 206. The second cover perimeter wall 201 may be continuous or discontinuous.

In some embodiments the second cover 200 includes a portion of reduced thickness 230. The portion of reduced thickness 230 may be located at an end proximate to the hinge of the phone. The portion of reduced thickness 230 may include a perimeter wall portion of reduced thickness 231. Such perimeter wall portion of reduced thickness 231 may be on either or both lateral sides of the second cover 200. In some embodiments the portion of the perimeter wall 201 proximate to the hinge is not of reduced thickness.

In some embodiments the portion of reduced thickness may include a back wall portion of reduced thickness 232. The back wall portion of reduced thickness 232 may span between the perimeter wall portion of reduced thickness 231 of the second cover 230. One skilled in the art will recognize that the size of the portions of reduced thickness on the respective first and second covers 100 and 200 may be of similar size.

In some embodiments the second cover 200 includes at least one post 240, protrusion, boss, pin, or other structure to pivot upon. The post 240 is positioned to extend laterally from the side of the second cover 200. In some embodiments, the post is positioned on the outer surface of the perimeter wall portion of reduced thickness 231 of the second cover 200. Such a post 240 is shown in FIG. 6. In some embodiments, the post 240, protrusion, boss, pin, or other structure to pivot upon is positioned adjacent to or overlies the pivot axis of the device when the cover is on the device. In some embodiments, the post 240 is positioned on a portion of the perimeter wall 201 proximate to the hinge of the phone, but the perimeter wall 201 is not of reduced thickness.

In some embodiments, the second cover 200 may include a second post 242 protrusion, boss, pin, or other structure to pivot upon. The second post 242 is positioned to extend from the perimeter wall portion of reduced thickness 231 of the second cover on the other lateral side from the post 240. One skilled in the art will also recognize the second post 242 may be similarly positioned on a perimeter wall portion that is proximate to the hinge of the phone, but not of reduced thickness. The post 240 and second post 242 are axially aligned to form an axis about which the second cover 200 may pivot.

In some embodiments, a hinge cover 300 is attached to the first cover 100 and the second cover 200. When the first cover 100 and second cover 200 are positioned on the phone, the hinge cover 300 is positioned proximate the hinge of the phone. With such positioning, the hinge cover 300 protects the hinge of the phone from impact.

In some embodiments, the hinge cover includes a first lateral portion 310 and a second lateral portion 320. The first lateral portion 310 and second lateral portion 320 may be joined by a back wall portion 330. The first lateral portion 310 and second lateral portion extend away from the back wall portion at generally 90-degree angles and oppose each other. In such a relationship, the hinge cover 300 forms a U shape.

As with the first and second covers themselves, the hinge cover 300 in some embodiments may not include a back wall portion 330. Such embodiments are shown in FIGS. 22-52 In such embodiments, the first and second lateral portions 310 and 320 cover the axis of the hinge of the device. In embodiments without a back wall portion 330, the first and second lateral portions 310 and 320 may not be connected. In such an embodiment, the first and second lateral portions 310 and 320 may be separate components, but still referred to as first and second lateral portions. Such components may also be referred to as hinge caps, or connectors. One skilled in the art will recognize without a back wall portion, such components may not protect the hinge line of the underlying phone or device, but still hingely connect the first and second cover portions 200 and 300.

In some embodiments, the hinge cover 300 includes an inner surface 301 that generally faces the phone when the case 10 is on the phone, and an outer surface 302, that faces away from the phone. The inner surface 301 of the first and second lateral portions 310 and 320 face each other in such a configuration, although the phone may be between them when the phone is in the case 10.

In some embodiments the hinge cover 300 includes slots 340, channels, or other structures to accept the posts of the first and second cover. The slots may be closed slots having a back, or the slots may be apertures that allow passage from one side of the hinge cover to the other side, such as from the inner surface 301 to the outer surface 302. The slots 340 may be a combination of closed slots and apertures, whether among the slots, or among a single slot. The slots 340 may be of a shape and size that allow the posts to rotate and translate along the slot as a cover is moved from a first position to a second position. Such movement from a closed first position to an open second position is shown in FIGS. 15-18. The slots 340 in the most preferred embodiment are obround. Other embodiments may include curved slots.

The slots 340 allow the pivot axis of the respective covers to move relative to the hinge cover 300 as the case 10 moves from a first configuration to a second configuration as shown in FIGS. 15-18. This allows the hinge cover to move relative to the first and second covers to better protect the hinge in all configurations of the cover. For instance, the movement allows any gap between the first or second cover and the hinge cover to be minimized. In some embodiments, the proximal ends 104 and 204 may be in contact with the inner surface 301 of the back wall portion 330 of the hinge cover 300. In some embodiments, the hinge cover inner surface 301 guides the first cover 100 or second cover 200, the proximal ends 104 and 204 of the respective covers being in contact with the inner surface 301 for at least a portion of the transition of the case from a first configuration to a second configuration.

Figure 14:
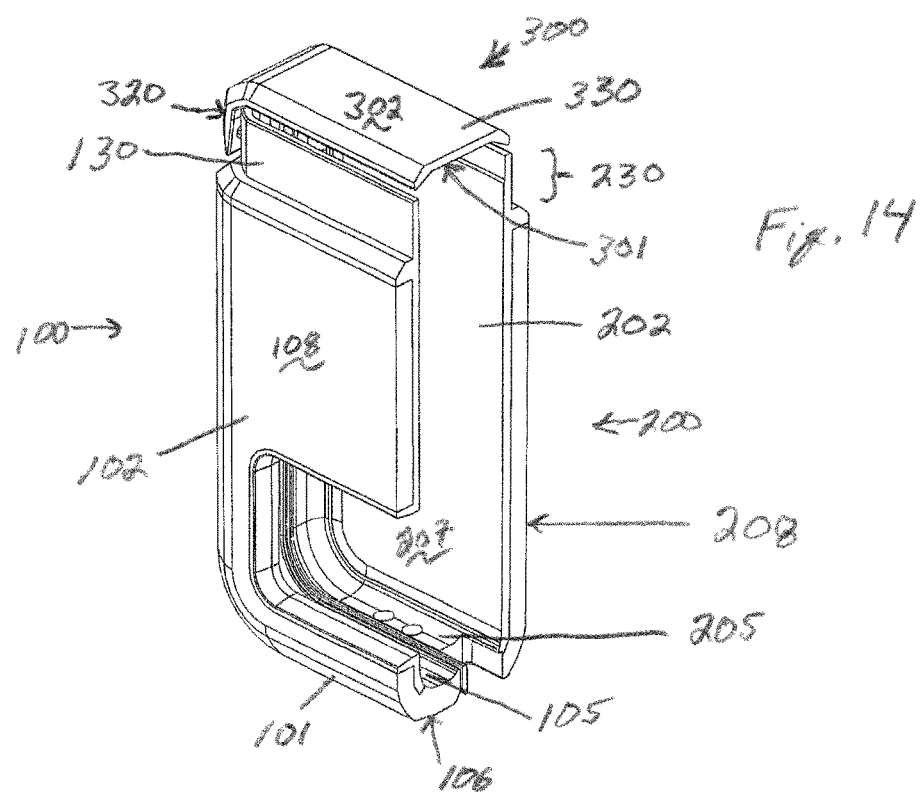
FIG. 14 is cross-sectional back side perspective view of the case of the present invention in a closed configuration.
Figure 15:
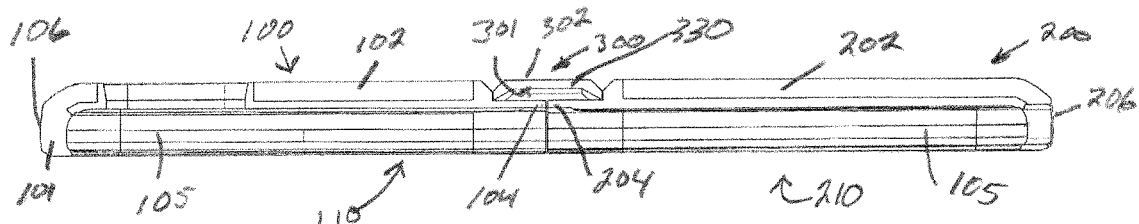
FIG. 15 is a side elevational cross-sectional view of the case of the present invention in the fully open position.
Figure 16:
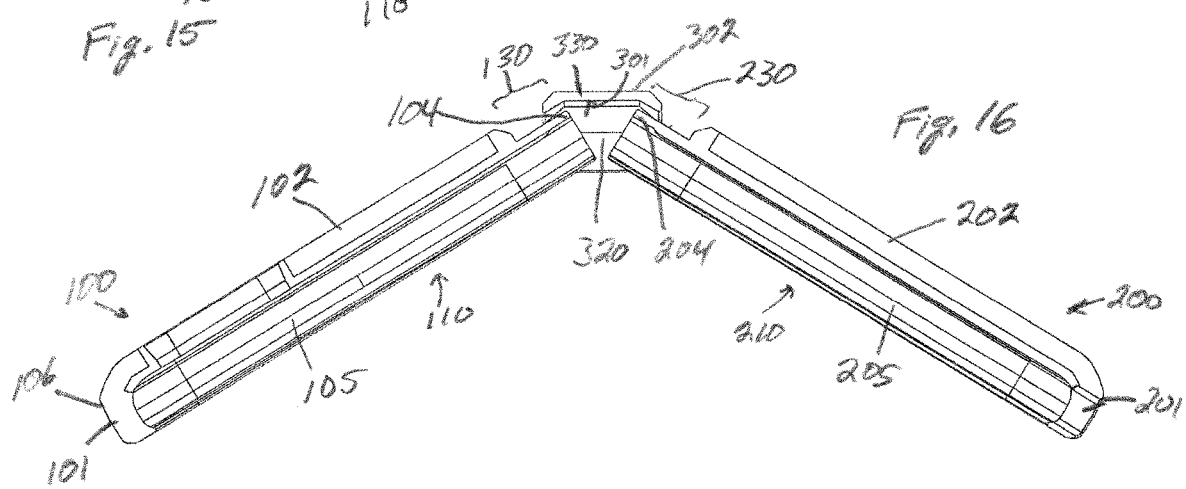
FIG. 16 is a side elevational cross-sectional view of the case of the present invention in a transitional position between opened and closed
Figure 17:
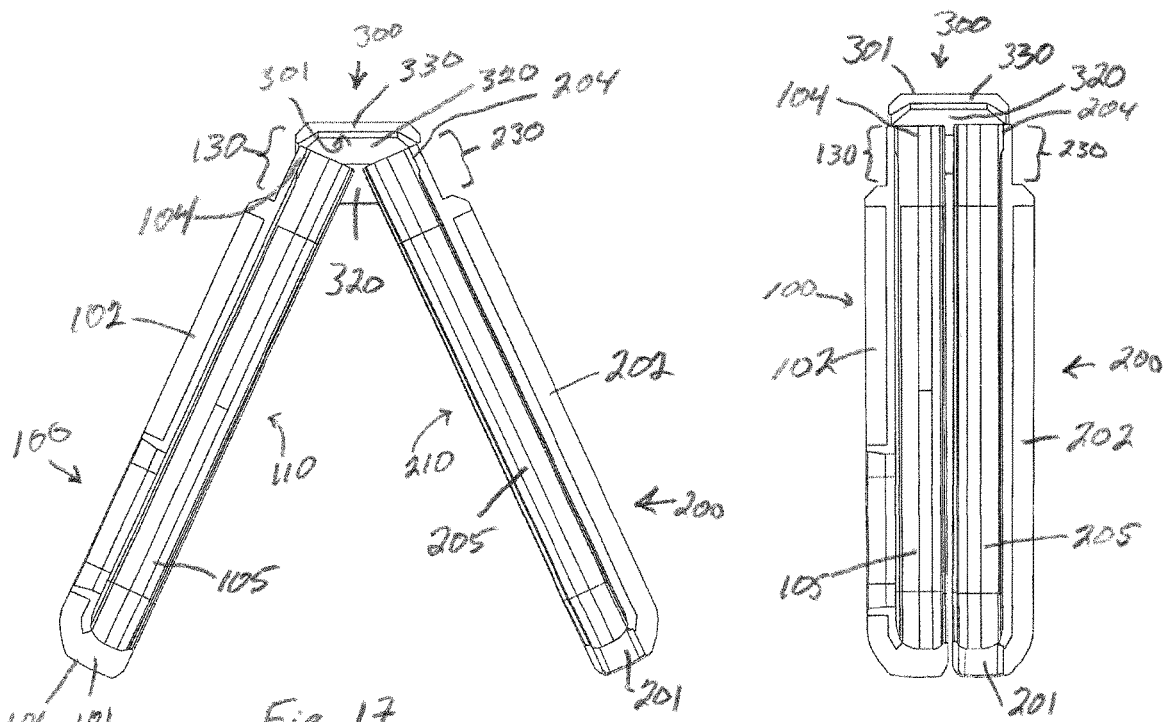
FIG. 17 is a side elevational cross-sectional view of the case of the present invention in a transitional position between opened and closed.
Figure 18:
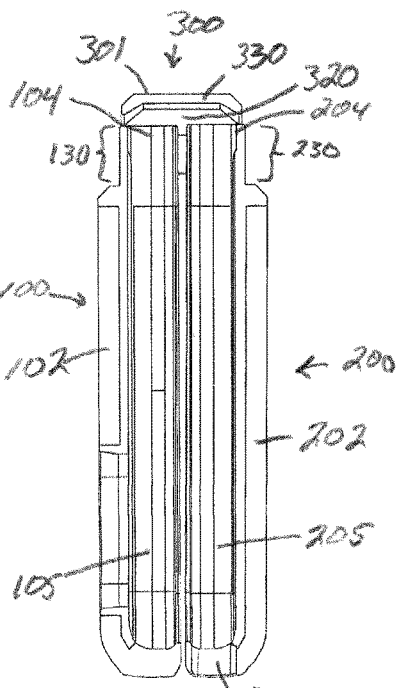
FIG. 18 is a is a side elevational cross-sectional view of the case of the present invention in a fully closed position.

In some embodiments, the first lateral portion 310 of the hinge cover includes a first slot 340a and a second slot 340b. The second lateral portion 320 includes a third slot 340c and a fourth slot 340d. The slots 340 are obround and oriented in a slanted direction, the slot end closest to the centerline 500 being closest to the back wall portion 330. Put another way, the slots 340 are slanted upwards toward the center of the back wall portion 330 when the hinge cover 330 is viewed with the back wall portion 330 located above the lateral portions 310 and 320, as in FIG. 10. With such a configuration, the back wall portion 330 may be positioned near to the proximal edge of the back wall of the first or second cover when the case is in the folded configuration, as seen in FIG. 14, while also allowing the back surfaces of the first and second covers and the hinge cover to be planar when the case is in the fully opened configuration.

One skilled in the art will recognize that the position of the slots and posts on the covers first 100 or second covers 200 and the third cover 300 or third cover first and second lateral portions 310 and 320 may be switched, so that the slots are located on the first or second cover and the posts are on the third cover 300.

In some embodiments, the back wall portion 330 inner surface 301 is concave, u-shaped, truncated V-shaped or dished in cross sectional profile perpendicular to the centerline 500. Such shape is shown in FIGS. 15-18. The shape of the inner surface 301 may also be described as a channel. The shape, channel, or profile of the inner surface 301 may guide proximal end 104 of the first cover 100 and proximal end 204 of the second cover 200 as the first and second cover are moved from an open position to a closed position. In some embodiments the profile of the inner surface 301 may be shaped to accommodate the proximal ends 104 and 204 as the first and second cover are moved from an open position to a closed position.

In some embodiments, as shown in FIGS. 15-20, the hinge cover 300 overlies the hinge of the phone 3 as the case 10 is opened or closed, the first and second covers 100 and 200 transitioning from a first position to a second position. As the transition takes place, the posts 140a-140d move within slots 340a-340d. In the fully opened position, the hinge cover 300 is positioned over a portion of the first cover 100 and a portion of the second cover 200 and the outer surface 302 of the back wall portion 330 hinge cover 300 is generally planar with a portion of the outer surface 106 of the first cover. In some embodiments, the outer surface of the back wall portion 330 of the hinge cover is also generally planar with the outer surface 108 of the second cover 200. In some embodiments the outer surface 302 of the back wall portion 330 of the hinge cover 300 is below the plane formed by the outer surface of the outer surface 106 of the first cover 100 when the case 10 is in the fully open position.

In some embodiments, when the case 10 is in the fully open position the case 10 may lie flat on a flat surface such as a tabletop when the outer surface 107 of the back wall of the first cover 100 is in contact with the surface or tabletop. In some embodiments, when the case is in the fully open position, the outer surface 107 of the back wall of the first cover 100 is coplanar with the outer surface 108 of the back wall of the second cover 200 and is coplanar with the outer surface of the back wall portion 330 of the hinge cover 300.

In some embodiments, a portion of the hinge cover 300 overlies the perimeter wall portion of reduced thickness 131 of the first cover. In some embodiments, a portion of the hinge cover 300 overlies the perimeter wall portion of reduced thickness 231 of the second cover 200. In some embodiments, a portion of the hinge cover overlies the back wall portion of reduced thickness 132 of the first cover. In some embodiments, a portion of the hinge cover overlies the back wall portion 232 of the second cover 200.

In some embodiments, the lateral portions 310 and 320 include structures to capture portions or extensions of the proximal ends of the first and second covers 100 and 200 as illustrated in FIGS. 22-52.

In such an embodiment, each of the lateral portions 310 and 320 include a first portion and a second portion. The respective portions may be connected by snap fit, adhesive, complementary engagement structures, or other known mechanisms. For purposes of the description, we will describe the first lateral portion 310, and one skilled in the art will readily recognize that such a construction may be applied to the second lateral portion 320. One skilled in the art will also recognize that the teachings for the lateral portions may be applied to those with and without back portions that join the lateral portions. One skilled in the art may refer to such lateral portions as connectors or hinge caps, as they serve to connect the first and second covers. Such lateral portions without a connecting back cap or protect the side of the hinge. The structures on the second cover may also have corresponding structures to those described on the first cover, such as bosses or other structures that a connector may interact with, as will be understood by one skilled in the art upon reviewing the structures on the first cover.

In some embodiments, as shown more specifically in FIGS. 22-34, the connector or lateral portion 310 may include a first portion 311 and a second portion 312. The connector or lateral portion 310 first portion 311 or second portion 312 may include a first receiver 314 and second receiver 315. The first receiver 314 and second receiver 315 to receive, accept or capture a post or boss 141 or 241 or 142 and 242 on each of the first 100 and second 200 covers respectively when the lateral portion 310 first portion 311 and second portion 312 are mated together in a closed configuration. Similarly, connector or lateral portion 320 may have a first portion 321 and a second portion 322, with features as described for the first lateral portion 310 or connector.

In some embodiments, the boss 141 or 142 is positioned on a portion of the perimeter wall 101. In the most preferred embodiment, the boss 141 or 142 is located near the proximal end 104 of the first cover 100 so as to be near the hinge. The boss 141 or 142 may be on an areas of the perimeter wall that is of reduced thickness 131. In some embodiments, the boss 141 or 142 is positioned on a bar-like extension of the perimeter wall.

In some embodiments, the boss 141 or 142 includes a flange or cap 143. The cap 143 extends from a narrowed portion 144 of the boss 141 or 142. The narrowed portion 144 of the boss 141 may be a cylinder axially aligned with the hinge of the portable electronic device. The narrowed portion 144 of the boss 141 or 142 thus forms an axle for rotation of the first 100 cover. The cap 143 is captured within a respective receiver 314 or 315. The boss 141 or 142 may be axially aligned with the hinge of the electronic device, the captured boss 141 or 142 allowing the respective cover to rotate with respect to the connector.

Similarly, the second cover 200 may include similar structures positioned in a similar manner. Of course, the second cover may have different structures commensurate with the disclosure. In some embodiments, the boss 241 or 242 is positioned on a portion of the perimeter wall 201. In the most preferred embodiment, the boss 241 or 242 is located near the proximal end 204 of the second cover 200 so as to be near the hinge. The boss 241 or 242 may be on an areas of the perimeter wall that is of reduced thickness 231. In some embodiments, the boss 241 or 242 is positioned on a bar-like extension of the perimeter wall.

In some embodiments, the boss 241 or 242 includes a flange or cap 243. The cap 243 extends from a narrowed portion 244 of the boss 241 or 242. The narrowed portion 244 of the boss 241 may be a cylinder axially aligned with the hinge of the portable electronic device. The narrowed portion 244 of the boss 241 or 242 thus forms an axle for rotation of the second cover 200. The cap 243 is captured within a respective receiver 314 or 315. The boss 241 or 242 may be axially aligned with the hinge of the electronic device, the captured boss 241 or 242 allowing the respective cover to rotate with respect to the connector.

In some embodiments, the lateral portions 310 or 320 or connectors include slots 316 and 317 to allow the proximal ends or an extension of the proximal ends of the respective perimeter wall to move or rotate beyond the bounds of the connectors. The slots 316 and 317 may communicate from the front side to the back side of the connector, allowing the proximal end of a cover to rotate within the respective slot 316 or 317. The rotation of the proximal end may be through approximately 90 degrees plus or minus from the horizontal or the plane of the open portable electronic device. In some embodiments, the rotation allowed by the slots 316 or 317 may be less than 90 degrees, thus limiting the opening or movement of the covers 100 and 200 from the closed to open positions.

In some embodiments, as shown in FIGS. 48-54, the lateral portions 310 and 320 or connectors may include vertical connector slots 371 and 372 as a receiver to accept projections 171 or 172 of the first cover and second cover respectively. The projections 171 or 172 may extend from the ends of the perimeter side portions of the first 100 or second 200 cover. The projections may be an extension of the proximal ends 104 and 204 of the respective covers 100 and 200. The projections 171 and 172 may be considered part of the areas of reduced thickness of the respective perimeter walls. The projections 171 and 172 are similar to the structures on which the bosses 141, 141, 241, and 242 are mounted on in previous embodiments.

The projections 171 or 172 in some embodiments may be flat or bar-like and be positioned with the plane of the projection being vertical. Vertical is referenced as being perpendicular to the screen of the phone when the phone is in the case 10. The projections 171 or 172 are sized to fit within the vertical connector slots 371 and 372 respectively. Within the vertical connector slots 371 and 372 are positioned a first axle 181 and a second axle 182 respectively. The axles are each axially aligned with the pivot or hinge axis of the underlying device. The first axle 181 engages a pivot slot 191 in the first cover projection 171, and the second axle 182 engages a pivot slot 192 in the second cover projection 172.

In some embodiments, the first and second cover projections 171 and 172 may each include a pivot slot 191 and 192. The respective pivot slot may terminate in a semicircular or concave terminal end of the pivot slot. The pivot slot may include parallel walls, or the walls may be a "V" shape to create a pivot slot which narrows toward but is in communication with the concave terminal end. In some embodiments, the concave terminal end is wider than the minimum width of the pivot slot 191 or 192. This condition may be true even when the pivot slot walls are parallel. The cover projection 171 or 172 with the pivot slot may be described as a fork or forked terminal end.

In some embodiments the connector 310 or 320 may include an inner lateral portion. The inner lateral portion may include a concave profile. The concave profile accepts the hinge of the device.

In some embodiments, the connector 310 or 320 includes an outer lateral portion. The connector inner and outer connector lateral portions are connected by the first or second axles. In some embodiments, the inner and outer connector lateral portions are connected by a web of material that is not an axle. In some embodiments, the inner and outer lateral portions are connected by two webs of material spaced apart from one another. In some embodiments, a web of material includes a profile that mirrors a profile of the projection. In some embodiments, a web of material includes a concave surface facing a respective projection.

The foregoing disclosure of specific embodiments is intended to be illustrative of the broad concepts comprehended by the invention and not limiting. One skilled in the art will recognize that the features and structures described herein may be combined in many ways consistent with the concepts described herein.

The invention claimed is:

1. A case for covering at least a portion of the housing of a portable electronic device, the case including a first cover for covering at least a portion of a first portion of the housing, a second cover for covering at least a portion of a second portion of the housing, and a third cover for covering at least a third portion of the housing, the first cover pivotably attached to the third cover, and the second cover pivotably attached to the third cover, the first cover including a first cover back exterior surface, the second cover including a second cover back exterior surface, and the third cover including a third cover back exterior surface, the first cover back exterior surface, second cover back exterior surface, and third cover back exterior surface being co-planar when the case is in a fully open position, the first cover including a first cover perimeter wall and the second cover including a second cover perimeter wall, the first cover including a first cover back wall spanning between the first cover perimeter wall, the second cover including a second cover back wall spanning the second cover perimeter wall, the third cover including a third cover back wall, the third cover back wall overlying at least a portion of the first cover back wall and at least a portion of the second cover back wall when the case is in the open position, wherein one of the third cover or the first cover perimeter wall includes a first protrusion and a second protrusion and an other of the first cover perimeter wall or the third cover includes a first receiver to receive the first protrusion and a second receiver to receive the second protrusion, wherein one of the third cover or the second cover perimeter wall includes a third protrusion and a fourth protrusion and an other of the second cover perimeter wall or the third cover includes a third receiver to receive the third protrusion and a fourth receiver to receive the fourth protrusion.

2. The case of claim 1 wherein the first protrusion and the second protrusion align to form a first axis and the third and fourth protrusion align to form a second axis, the first cover rotating about the first axis with respect to the third cover and the second cover rotating about the second axis with respect to the third cover when the case is moved from an open to closed position.

3. The case of claim 1 wherein the first receiver and the second receiver are obround.

4. The case of claim 1 wherein the third cover includes a first lateral portion and a second lateral portion, one of the first protrusion or first receiver being located on the first lateral portion and an other of the first receiver or first protrusion being located on the second lateral portion, the first lateral portion and second lateral portions opposing at least a portion of the first cover perimeter wall.

5. The case of claim 1 wherein at least a portion of the first cover back exterior surface underlies at least a first portion of the third cover back exterior surface and at least a portion of the second cover back exterior surface underlies at least a second portion of the third cover when the case is in the fully open position.

6. The case of claim 1 wherein the first receiver accepting structure includes arcuate profiles.

7. The case of claim 1 wherein the first cover pivots and translates with respect to the third cover.

8. The case of claim 1 wherein the first receiver is an aperture.

9. The case of claim 1 wherein the first receiver is a slot.

10. The case of claim 1 wherein the first protrusion pivots and translates within the first receiver when the case is moved from an open position to a closed position.

11. The case of claim 10 wherein the first receiver is a slot.

12. A case for covering at least a portion of the housing of a portable electronic device, the case including a first cover for covering at least a portion of a first portion of the housing, a second cover for covering at least a portion of a second portion of the housing, and a third cover for covering at least a third portion of the housing, the first cover pivotably attached to the third cover, and the second cover pivotably attached to the third cover, the first cover including a first cover back exterior surface, the second cover including a second cover back exterior surface, and the third cover including a third cover back exterior surface, the first cover back exterior surface, second cover back exterior surface, and third cover back exterior surface being co-planar when the case is in a fully open position, the first cover including a first cover perimeter wall and the second cover including a second cover perimeter wall, the first cover including a first cover back wall spanning between the first cover perimeter wall, the second cover including a second cover back wall spanning the second cover perimeter wall, the third cover including a third cover back wall, the third cover back wall overlying at least a portion of the first cover back wall and at least a portion of the second cover back wall when the case is in the open position, wherein the first cover back wall has a first cover back wall area of reduced thickness, the second cover back wall has a second cover back wall area of reduced thickness, the third cover overlying at least a portion of the first cover back wall area of reduced thickness and at least a portion of the second cover back wall area of reduced thickness when the case is in the fully open position.

* * * * *